US011470555B2

(12) United States Patent
Tanaka et al.

(10) Patent No.: US 11,470,555 B2
(45) Date of Patent: *Oct. 11, 2022

(54) INFORMATION PROCESSING DEVICE, AND INFORMATION PROCESSING METHOD USING MULTIPLE MULTIPLEXING METHODS

(71) Applicant: Sony Corporation, Tokyo (JP)

(72) Inventors: Yusuke Tanaka, Tokyo (JP); Yuichi Morioka, Kanagawa (JP); Takeshi Itagaki, Saitama (JP); Tomoya Yamaura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/128,222

(22) Filed: Dec. 21, 2020

(65) Prior Publication Data

US 2021/0112496 A1 Apr. 15, 2021

Related U.S. Application Data

(63) Continuation of application No. 15/579,338, filed as application No. PCT/JP2016/063623 on May 6, 2016, now Pat. No. 10,893,476.

(30) Foreign Application Priority Data

Jul. 6, 2015 (JP) .............................. JP2015-134966

(51) Int. Cl.
*H04W 52/02* (2009.01)
*H04W 84/12* (2009.01)
*H04W 74/02* (2009.01)

(52) U.S. Cl.
CPC ....... *H04W 52/0238* (2013.01); *H04W 52/02* (2013.01); *H04W 52/0216* (2013.01);
(Continued)

(58) Field of Classification Search
CPC ..... H04W 84/12; H04W 52/00; H04W 52/02; H04W 52/0209–0222; Y02D 30/70
See application file for complete search history.

(56) References Cited

U.S. PATENT DOCUMENTS 9,780,923 B2  10/2017  Noh et al.
2010/0040033 A1  2/2010  Xhafa et al.
(Continued)

FOREIGN PATENT DOCUMENTS

CN      103430601 A     12/2013
JP      2005-197798 A   7/2005
(Continued)

OTHER PUBLICATIONS

International Search Report dated Jul. 12, 2016, in PCT/JP2016/063623 filed May 6, 2016.
(Continued)

*Primary Examiner* — Robert C Scheibel
(74) *Attorney, Agent, or Firm* — Xsensus LLP

(57) ABSTRACT

An information processing device includes a control unit. A first device that transmits data to the information processing device has a multiplexing function for multiplexing and transmitting data from a plurality of devices including the first device to the information processing device. The control unit provided in the information processing device performs control to tell the first device having the multiplexing function a multiplexing method for notification information and presence of data addressed to the first device. The notification information indicates that the first device has shifted from a functional suspension state to a data receivable state. The information processing device can reduce power consumption.

12 Claims, 23 Drawing Sheets

(52) U.S. Cl.
CPC ... *H04W 52/0219* (2013.01); *H04W 52/0229* (2013.01); *H04W 74/02* (2013.01); *H04W 84/12* (2013.01); *Y02D 30/70* (2020.08)

(56) References Cited

U.S. PATENT DOCUMENTS

| | | |
|---|---|---|
| 2012/0224534 A1 | 9/2012 | Kimura et al. |
| 2013/0336184 A1 | 12/2013 | Kwon et al. |
| 2013/0336245 A1 | 12/2013 | Fischer |
| 2015/0063111 A1 | 3/2015 | Merlin et al. |
| 2015/0131508 A1* | 5/2015 | Merlin ............... H04W 52/0216 370/311 |
| 2015/0289269 A1 | 10/2015 | Kwon et al. |
| 2015/0382306 A1 | 12/2015 | Lee et al. |
| 2016/0174108 A1 | 6/2016 | Jeong et al. |
| 2016/0183189 A1 | 6/2016 | Merlin et al. |
| 2016/0330714 A1 | 11/2016 | Hedayat |
| 2017/0280383 A1* | 9/2017 | Park ...................... H04W 74/06 |
| 2018/0167882 A1* | 6/2018 | Choi ................... H04W 72/121 |

FOREIGN PATENT DOCUMENTS

| | | |
|---|---|---|
| JP | 2005-295186 A | 10/2005 |
| JP | 2007-214920 A | 8/2007 |
| JP | 2011-109205 A | 6/2011 |
| JP | 2013/185608 A1 | 12/2013 |
| WO | 2014/179486 A1 | 11/2014 |

OTHER PUBLICATIONS

Extended European Search Report dated Jan. 3, 2019 in European Application No. 16821088.8-1219.
IEEE Std. 802.11, Part 11: Wireless LAN Medium Access Control (MAC) and Physical Layer (PHY) Specifications, Mar. 29, 2012. All Pages (Year: 2012).

* cited by examiner

EXAMPLE OF IE FOR TELLING SUPPORT FOR TRIGGER MULTIPLEX TRANSMISSION
(Trigger Multiplex Information Element)

Traffic Indication Virtual Bitmap(TIVB)

EXAMPLE OF FRAME FORMAT OF TIM

EXAMPLE OF RELATIONSHIP BETWEEN TIVB AND PVB

Traffic Indication Virtual Bitmap(TIVB)

| | 1 octet | 1 octet | 1 octet | |
|---|---|---|---|---|
| AID | 1 2 3 4 5 6 7 8 | 9 10 11 12 13 14 15 16 | 17 18 19 20 21 22 23 24 | 2008 |
| TIVB bit | 1 1 1 1 1 1 1 1 | 1 1 1 1 1 1 1 1 | 0 0 1 1 0 0 0 1 ... | 0 |

Partial Virtual Bitmap(PVB)

| | 1 octet | 1 octet | 1 octet |
|---|---|---|---|
| AID | 1 2 3 4 5 6 7 8 | 9 10 11 12 13 14 15 16 | 17 18 19 20 21 22 23 24 |
| PVB bit | 1 1 1 1 1 1 1 1 | 1 1 1 1 1 1 1 1 | 0 0 1 1 0 0 0 1 | a b

EXAMPLE OF ENCODED FRAME FOR SPATIAL MULTIPLEX TRANSMISSION $$R_1 = H \times M_{n1} \times LTFT_1$$
$$R_2 = H \times M_{n2} \times LTFT_2$$
$$R_3 = H \times M_{n3} \times LTFT_3$$
$$R_4 = H \times M_{n4} \times LTFT_4$$

$$+R_1 + R_2 + R_3 - R_4 = (0,0,h_3,0)$$
$$+R_1 + R_2 - R_3 + R_4 = (0,h_2,0,0)$$
$$+R_1 - R_2 + R_3 + R_4 = (h_1,0,0,0)$$
$$-R_1 + R_2 + R_3 + R_4 = (0,0,0,h_4)$$

INFORMATION PROCESSING DEVICE, AND INFORMATION PROCESSING METHOD USING MULTIPLE MULTIPLEXING METHODS

CROSS REFERENCE TO RELATED APPLICATIONS

This application is a continuation of U.S. application Ser. No. 15/579,338, now U.S. Pat. No. 10,893,476, filed Dec. 4, 2017, which is based on PCT filing PCT/JP2016/063623, filed May 6, 2016, which claims priority to JP 2015-134966, filed Jul. 6, 2015, the entire contents of each are incorporated herein by its reference.

TECHNICAL FIELD

The present technology relates to an information processing device. More particularly, the present technology relates to an information processing device and an information processing method for exchanging information using wireless communication and a program that causes a computer to execute the method.

BACKGROUND ART

Conventionally, there are wireless communication technologies for exchanging information using wireless communication. For example, communication methods for exchanging information between information processing devices using a wireless LAN have been proposed.

Further, for example, in a case where the information processing device is a mobile object, its power source is typically a battery. For this reason, it is important to reduce power consumption in order to extend the operating time of the information processing device. Therefore, for example, a technology for reducing power consumption by shifting from an awake state in which normal operation is performed to a doze state in which signal transmission/reception is not performed when an information processing device does not need to communicate has been proposed in relation to IEEE 802.11 of the Institute of Electrical and Electronic Engineers, which is the standard organization for wireless LANs.

In this technology, a slave device in the doze state is put into the awake state at regular intervals to confirm whether data addressed to the slave device itself are buffered in a base station using a signal from the base station. This signal is a traffic indication map (TIM) in a beacon frame. Then, in a case where data addressed to the slave device itself are buffered, the slave device receives the data by transmitting a data request frame (power save poll (PS-Poll)) to the base station, and returns to the doze state after receiving the data. Note that the PS-Poll is information for telling the awake state and the data transmission request.

Here, in a case where pieces of data addressed to a plurality of slave devices are told through a TIM, a collision avoidance algorithm may be used in order to avoid collisions between PS-Polls. However, time loss can occur due to the collision avoidance algorithm.

Further, for example, in a case where the base station receives a PS-Poll from one slave device, data transmission is performed in response to the PSPoll. In this case, during the transmission, other slave devices cannot perform transmission. For this reason, it takes other slave devices a long time to return to the doze state, and power consumption may increase.

Therefore, technologies for making it possible to reduce time loss due to the avoidance of collisions between PS-Polls and time loss due to communication performed by another slave device have been proposed. For example, a data transmission/reception system for setting and telling in advance time to transmit a PS-Poll for each slave device so as to avoid collisions between PS-Polls has been proposed (for example, refer to Patent Document 1).

CITATION LIST

Patent Document

Patent Document 1: Japanese Patent Application Laid-Open No. 2005-197798

SUMMARY OF THE INVENTION

Problems to be Solved by the Invention

According to the above-described conventional technology, time loss due to the collision avoidance algorithm can be reduced. However, since the respective slave devices transmit the PS-Polls in different time slots as they have been told, time loss due to the plurality of PS-Polls occurs. For this reason, each slave device is in the power saving state for only a short period of time, and there is a possibility that power consumption cannot be reduced.

The present technology has been made in view of such a situation, and an object thereof is to reduce power consumption.

Solutions to Problems

The present technology has been made in order to solve the above-mentioned problem, and a first aspect thereof is: an information processing device including a control unit that performs control to tell a first device a multiplexing method for notification information and presence of data addressed to the first device, the first device having a multiplexing function for multiplexing and transmitting data from a plurality of devices including the first device to the information processing device, the notification information indicating that the first device has shifted from a functional suspension state to a data receivable state; an information processing method therefor; and a program that causes a computer to execute the method. This produces the effect of telling a first device having a multiplexing function a multiplexing method for notification information indicating that the first device has shifted from a functional suspension state to a data receivable state and presence of data addressed to the first device.

Further, in the first aspect, the control unit may perform control to receive the notification information multiplexed and transmitted by the first device according to the multiplexing method told. This produces the effect of receiving the notification information multiplexed and transmitted by the first device according to the multiplexing method told.

Further, in the first aspect, after receiving the notification information, the control unit may perform control to multiplex data to be transmitted to the first device and transmit the data to the first device. This produces the effect of multiplexing data to be transmitted to the first device and transmitting the data to the first device after receiving the notification information.

Further, in the first aspect, the control unit may perform control to multiplex the data using a multiplexing method that is the same as or different from the multiplexing method told, and transmit the data to the first device. This produces the effect of multiplexing the data using a multiplexing method that is the same as or different from the multiplexing method told, and transmitting the data to the first device.

Further, in the first aspect, the control unit may perform control to tell a frequency multiplexing method or a spatial multiplexing method as the multiplexing method, multiplex the data using a multiplexing method that is the same as the frequency multiplexing method or spatial multiplexing method told, and transmit the data to the first device. This produces the effect of telling a frequency multiplexing method or a spatial multiplexing method as the multiplexing method, multiplexing the data using a multiplexing method that is the same as the frequency multiplexing method or spatial multiplexing method told, and transmitting the data to the first device.

Further, in the first aspect, the control unit may perform control to tell the first device a multiplexing method for the data together with the multiplexing method for the notification information. This produces the effect of telling the first device a multiplexing method for the data together with the multiplexing method for the notification information.

Further, in the first aspect, the control unit may perform control to tell the first device information to be used for multiplexing transmission of the notification information together with the multiplexing method for the notification information. This produces the effect of telling the first device information to be used for multiplexing transmission of the notification information together with the multiplexing method for the notification information.

Further, in the first aspect, the control unit may tell the first device, as the information to be used for the multiplexing transmission of the notification information, either frequency assignment for frequency multiplexing of the notification information (for example, center frequency and frequency bandwidth) or matrix index assignment for spatial multiplexing of the notification information, information about transmission time for the notification information, and information about transmission power for the notification information. This produces the effect of telling the first device either frequency assignment for frequency multiplexing of the notification information or matrix index assignment for spatial multiplexing of the notification information, information about transmission time for the notification information, and information about transmission power for the notification information.

Further, in the first aspect, the control unit may tell the first device using a bitmap generated on the basis of a partial virtual bitmap (PVB). This produces the effect of telling the first device using a bitmap generated on the basis of a PVB.

Further, in the first aspect, the control unit may confirm in advance that the first device has the multiplexing function for the notification information. This produces the effect of confirming in advance that the first device has the multiplexing function for the notification information.

Further, in the first aspect, the control unit may tell the first device at a timing when the first device is estimated to have shifted from the functional suspension state to the data receivable state. This produces the effect of telling the first device at a timing when the first device is estimated to have shifted from the functional suspension state to the data receivable state.

Further, in the first aspect, the control unit may tell the first device using a beacon or another frame transmitted after the beacon. This produces the effect of telling the first device using a beacon or another frame transmitted after the beacon.

In addition, a second aspect of the present technology is: an information processing device including a control unit that performs control to, in response to a multiplexing method for notification information indicating a shift from a functional suspension state to a data receivable state being told by another device, multiplex the notification information according to the multiplexing method and transmit the notification information to the other device; an information processing method therefor; and a program that causes a computer to execute the method. This produces the effect of, in response to a multiplexing method for notification information indicating a shift from a functional suspension state to a data receivable state being told by another device, multiplexing the notification information according to the multiplexing method and transmitting the notification information to the other device.

Further, in the second aspect, the control unit may perform control to receive multiplexed data transmitted from the other device after transmitting the notification information, and multiplex and transmit data to be transmitted to the other device after transmitting the notification information. This produces the effect of receiving multiplexed data transmitted from the other device after transmitting the notification information, and multiplexing and transmitting data to be transmitted to the other device after transmitting the notification information.

Further, in the second aspect, the control unit may perform control to multiplex the data using a multiplexing method that is the same as or different from the multiplexing method told, and transmit the data to the other device. This produces the effect of multiplexing the data using a multiplexing method that is the same as or different from the multiplexing method told, and transmitting the data to the other device.

Further, in the second aspect, the control unit may multiplex the data using a multiplexing method for the data told together with the multiplexing method for the notification information, and transmit the data to the other device. This produces the effect of multiplexing the data using a multiplexing method for the data told together with the multiplexing method for the notification information, and transmitting the data to the other device.

Effects of the Invention

The present technology can achieve the excellent effect of making it possible to reduce power consumption. Note that the effects described herein are not necessarily limited, and any of the effects described in the present disclosure may be obtained.

MODE FOR CARRYING OUT THE INVENTION

Hereinafter, a mode for carrying out the present technology (hereinafter referred to as an embodiment) will be described. The description will proceed in the following order.

1. Embodiment (example in which slave devices multiplex and transmit triggers according to a multiplexing method told by a base station)

2. Application Example

1. Embodiment

[Exemplary Configuration of Communication System]

Figure 1:
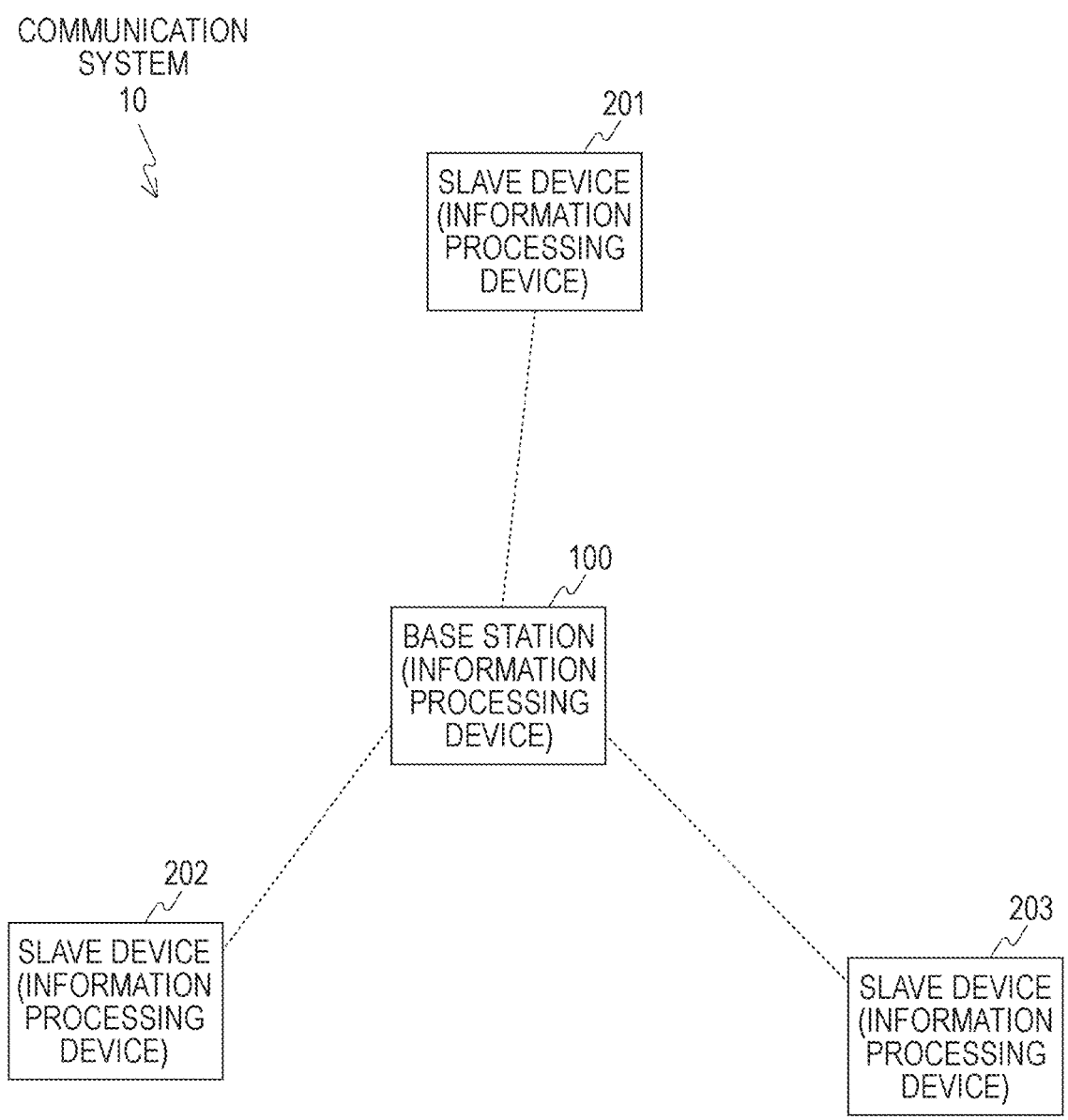
FIG. 1 is a diagram illustrating an example of a system configuration of a communication system 10 according to an embodiment of the present technology.

FIG. 1 is a diagram illustrating an example of a system configuration of a communication system 10 according to an embodiment of the present technology. In the example illustrated in FIG. 1, there are four information processing devices (a base station 100, a slave device 201, a slave device 202, and a slave device 203), and connections to one of the four information processing devices (for example, base station 100) are established by the other three information processing devices (for example, slave devices 201 to 203).

For example, each of the base station 100 and the slave devices 201 to 203 can be a fixed or portable information processing device having a wireless communication function. Here, examples of the fixed information processing device include information processing devices such as an access point in a wireless local area network (LAN) system and a base station. Further, examples of the portable information processing device include information processing devices such as a smartphone, a mobile phone, and a tablet terminal.

Further, it is assumed that each of the base station 100 and the slave devices 201 to 203 has a communication function conforming to the wireless LAN standard of the Institute of Electrical and Electronic Engineers (IEEE) 802.11, for example. For example, each of the base station 100 and the slave devices 201 to 203 can have a communication function conforming to the wireless LAN standard of IEEE 802.11ax. In addition, as the wireless LAN, for example, wireless fidelity (Wi-Fi), Wi-Fi Direct, and Wi-Fi CERTIFIED Miracast specification (technical specification title: Wi-Fi Display) can be used. Alternatively, wireless communication may be performed using another communication method.

For example, the communication system 10 can be a network in which a plurality of devices performs wireless communication in a one-to-one manner to be connected to one another (for example, mesh network and ad hoc network). For example, the communication system 10 can be applied to a mesh network of IEEE 802.11s.

Further, for example, the communication system 10 can be a network including an access point (master device) and its subordinate devices (slave devices). In the example provided by the embodiment of the present technology, the base station 100 serves as the access point, and the slave devices 201 to 203 serve as the subordinate devices of the access point (base station 100).

In addition, in FIG. 1, an example of a communication path through which devices can directly communicate with each other using wireless communication is indicated by a dotted line.

Note that, in the embodiment of the present technology, the operation of a transmission source device (transmission-side device) and the operation of a transmission destination device (reception-side device) are individually described for the sake of convenience, but both functions may be mounted in each device, or only one of the functions may be mounted in each device.

Further, the system configuration to which the embodiment of the present technology is applied is not limited to the above. For example, although the communication system including the four information processing devices is illustrated in the example of FIG. 1, the number of information processing devices is not limited thereto. In addition, the connection form of a plurality of information processing devices is also not limited to the respective connection forms described above. For example, the embodiment of the present technology can also be applied to a network in which a plurality of devices is connected using a connection form other than the respective connection forms described above.

[Exemplary Functional Configuration of Information Processing Device]

Figure 2:
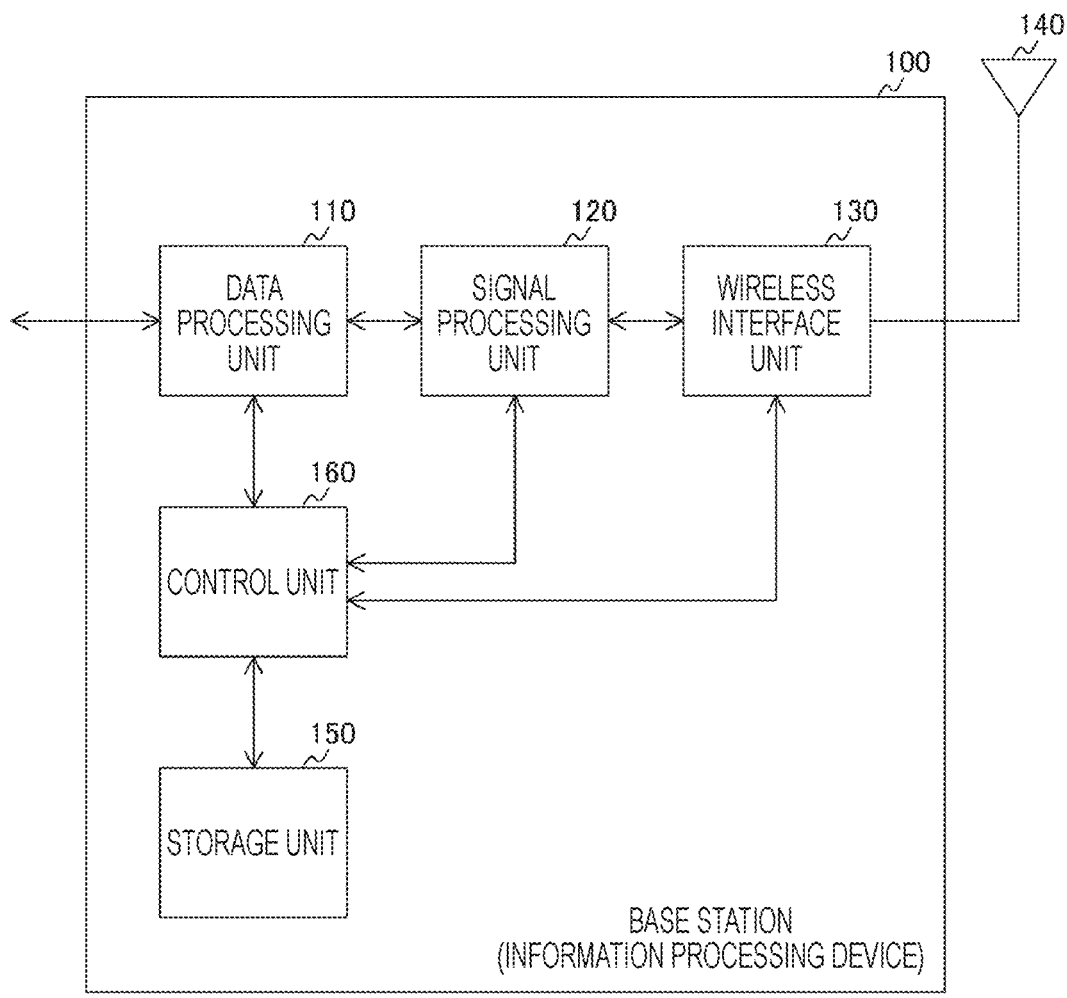
FIG. 2 is a block diagram illustrating an exemplary functional configuration of a base station 100 according to the embodiment of the present technology.

FIG. 2 is a block diagram illustrating an exemplary functional configuration of the base station 100 according to the embodiment of the present technology. Note that since the functional configuration of each of the slave devices 201 to 203 is similar to that of the base station 100, the description thereof is omitted here.

The base station 100 includes a data processing unit 110, a signal processing unit 120, a wireless interface unit 130, an antenna 140, a storage unit 150, and a control unit 160.

The data processing unit 110 processes various types of data on the basis of the control of the control unit 160. For example, at the time of data transmission, the data processing unit 110 performs a process of adding a media access control (MAC) header, an error detection code, and the like to data from an upper layer, and generates a packet for wireless transmission. Then, the data processing unit 110 supplies the generated packet to the signal processing unit 120.

Further, for example, at the time of data reception, the data processing unit 110 performs a process of analyzing a header, detecting a packet error, and the like on a bit string received from the signal processing unit 120, and supplies the processed data to an upper layer. Further, for example, the data processing unit 110 tells the control unit 160 the header analysis result, the packet error detection result, and the like.

The signal processing unit 120 performs various signal processes on the basis of the control of the control unit 160. For example, at the time of data transmission, the signal processing unit 120 encodes input data from the data processing unit 110 on the basis of coding and modulation schemes set by the control unit 160, and adds a preamble and a PHY header. Then, the signal processing unit 120 supplies a transmission symbol stream obtained through the signal process to the wireless interface unit 130.

Further, for example, at the time of data reception, the signal processing unit 120 detects a preamble and a PHY header from a reception symbol stream received from the wireless interface unit 130, performs a decoding process, and supplies it to the data processing unit 110. Further, for example, the signal processing unit 120 tells the control unit 160 the PHY header detection result and the like.

The wireless interface unit 130 is an interface for connecting to another information processing device and transmitting and receiving various kinds of information using wireless communication on the basis of the control of the control unit 160. For example, at the time of data transmission, the wireless interface unit 130 converts the input from the signal processing unit 120 into an analog signal, subjects the analog signal to amplification, filtering, and up-conversion to a predetermined frequency, and sends it to the antenna 140.

In addition, for example, at the time of data reception, the wireless interface unit 130 performs the inverse process of the process for data transmission on the input from the antenna 140, and supplies the processing result to the signal processing unit 120.

The storage unit 150 serves as a work area in which the control unit 160 processes data, and functions as a storage medium that holds various types of data. As the storage unit 150, for example, storage media such as a non-volatile memory, a magnetic disk, an optical disk, and a magneto-optical (MO) disk can be used. Note that, as the non-volatile memory, for example, an electrically erasable programmable read-only memory (EEPROM) or an erasable programmable ROM (EPROM) can be used. In addition, as the magnetic disk, for example, a hard disk or a disk-shaped magnetic body disk can be used. In addition, as the optical disk, for example, a compact disc (CD), a digital versatile disc recordable (DVD-R) disc, or a Blu-ray disc (BD, registered trademark) can be used.

The control unit 160 controls the reception operation and transmission operation of each of the data processing unit 110, the signal processing unit 120, and the wireless interface unit 130. For example, the control unit 160 causes the respective units to exchange information, sets communication parameters, and schedules packets in the data processing unit 110.

For example, the control unit 160 performs control to tell a slave device having a multiplexing function a multiplexing method for notification information and presence of data addressed to the slave device. The notification information indicates that the slave device has shifted from a functional suspension state to a data receivable state. In this case, for example, the control unit 160 can tell the slave device at a timing when the slave device is estimated to have shifted from the functional suspension state to the data receivable state. Further, for example, the control unit 160 can tell the slave device using a beacon or another frame transmitted after the beacon. Further, for example, the control unit 160 can confirm in advance that the slave device has the multiplexing function for the notification information.

As used herein, the notification information is, for example, a PS-Poll, a QoS Null (PM=0), a frame that tells the end of the functional suspension state, or the like. As used herein, the PS-poll is a signal indicating the end of the power saving state (for example, functional suspension state) and indicating a data request. Further, the QoS Null (PM=0) is a signal indicating the end of the power saving state (for example, functional suspension state). Note that, in the description of the embodiment of the present technology, the notification information is referred to as a trigger.

Further, multiplex transmission means that a plurality of signals (pieces of data) is combined and transmitted using one or more shared transmission lines. In addition, the multiplex transmission is also referred to as multiplexing transmission, multiplex transfer, or multiplex communication. Further, a transmission method for transmitting pieces of data from a plurality of slave devices to one base station at the same timing can be grasped as uplink multiplexing transmission to the base station.

In addition, a slave device that supports the uplink multiplexing transmission of triggers to a base station (slave device having a trigger multiplex transmission function) is referred to as a slave device having a multiplexing function. In other words, the slave device having the multiplexing function can cooperate with other slave devices to multiplex and transmit pieces of data to an information processing device (perform uplink multiplexing transmission). In addition, a slave device that does not support the uplink multiplexing transmission of triggers to a base station (slave device that does not have a trigger multiplex transmission function) is referred to as a legacy device.

Further, the functional suspension state means a state in which at least a part of the functions of a slave device is suspended. For example, the functional suspension state can be a state in which the reception function of a slave device is suspended (for example, low power consumption state (e.g., doze state)). However, for example, it is also assumed that even though a slave device is in the low consumption state in relation to the connected base station, the slave device is performing another operation. In addition, it is also assumed that even though a slave device is in the low consumption state in relation to the connected base station, the slave device is performing the operation for a group other than the connected group. In addition, it is also assumed that even though a slave device is in the low consumption state in relation to the connected base station, the slave device is searching for a group other than the connected group. Therefore, the functional suspension state also includes a case where even though a slave device is in the low consumption state in relation to the connected base station, the slave device is not in the low consumption state in relation to a device other than the connected base station. In addition, the functional suspension state of a base station can be similarly explained.

Further, for example, the control unit 160 performs control to receive notification information multiplexed and transmitted by a slave device according to the multiplexing method told to the slave device. In this case, the control unit 160 can perform control to multiplex data to be transmitted to the slave device and transmit the data to the slave device after receiving the notification information. For example, the control unit 160 can perform control to multiplex data using a multiplexing method that is the same as or different from the multiplexing method told to the slave device, and transmit the data to the slave device. For example, the control unit 160 can tell a frequency multiplexing method or a spatial multiplexing method as the multiplexing method, multiplex data using the multiplexing method that is the same as the frequency multiplexing method or spatial multiplexing method told, and transmit the data to the slave device. Specifically, in a case where the control unit 160 has told the frequency multiplexing method as the multiplexing method, the control unit 160 can perform frequency multiplexing on data using the frequency multiplexing method that is the same as the frequency multiplexing method told, and transmit the data to the slave device. In addition, in a case where the control unit 160 has told the spatial multiplexing method as the multiplexing method, the control unit 160 can perform spatial multiplexing on data using the spatial multiplexing method that is the same as the spatial multiplexing method told, and transmit the data to the slave device.

For example, the control unit 160 may perform control to tell the slave device a multiplexing method for data together with the multiplexing method for notification information.

In addition, for example, the control unit 160 may perform control to tell the slave device information to be used for multiplexing transmission of notification information together with the multiplexing method for notification information. In this case, for example, the control unit 160 can tell the slave device, as the information to be used for the multiplexing transmission of the notification information, either frequency assignment for frequency multiplexing of the notification information (for example, center frequency and frequency bandwidth) or matrix index assignment for spatial multiplexing of the notification information, information about transmission time for the notification information, and information about transmission power for the notification information. Further, for example, the control unit 160 can tell the slave device using a bitmap (illustrated in FIG. 7) generated on the basis of a partial virtual bitmap (PVB).

Further, for example, the control unit of a slave device (corresponding to the control unit 160) can perform control to, in response to a multiplexing method for notification information being told by the base station 100, multiplex the notification information according to the multiplexing method and transmit the notification information to the base station 100. For example, in response to the multiplexing method being told by the base station 100 at the timing when the slave device shifts from the functional suspension state to the data receivable state, the control unit of the slave device can transmit the notification information to the base station 100 according to the multiplexing method. Further, for example, the control unit of the slave device can tell the base station 100 in advance that the slave device supports the multiplexing of notification information.

In addition, for example, the control unit of the slave device can perform control to receive multiplexed data transmitted from the base station 100 after transmitting the notification information, and multiplex and transmit data to be transmitted to the base station 100 after transmitting the notification information.

Further, for example, the control unit of the slave device can perform control to multiplex data using a multiplexing method that is the same as or different from the multiplexing method told, and transmit the data to the base station 100. For example, in a case where the told multiplexing method is frequency multiplexing, data can be multiplexed using frequency multiplexing that is based on the same frequency as the told frequency multiplexing, and transmitted to the base station 100. Further, for example, in a case where the told multiplexing method is spatial multiplexing that is based on matrix indices, data can be multiplexed using spatial multiplexing that is based on the same matrix indices as the told spatial multiplexing, and transmitted to the base station 100.

Further, for example, the control unit of the slave device can multiplex data using a multiplexing method for data told together with the multiplexing method for notification information, and transmit the data to the base station 100.

[Exemplary Configuration of Trigger Multiplex Transmission Support Notification Frame]

Figure 3:
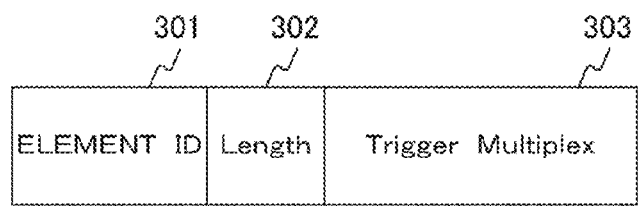
FIG. 3 is a diagram illustrating an exemplary configuration of a frame that is used by slave devices 201 to 203 to tell the base station 100 support for trigger multiplex transmission according to the embodiment of the present technology.

FIG. 3 is a diagram illustrating an exemplary configuration of a frame that is used by the slave devices 201 to 203 to tell the base station 100 support for trigger multiplex transmission according to the embodiment of the present technology. In the example illustrated in FIG. 3, an information element (IE) for telling support for trigger multiplex transmission is used.

The IE includes ELEMENT ID 301, Length 302, and Trigger Multiplex 303. Note that, in FIG. 3, numerical values representing octets of the respective fields are indicated below the respective fields. Further, similarly, in each of the subsequent drawings, numerical values representing octets of the respective fields (or a part thereof) are indicated below the respective fields.

The ELEMENT ID 301 contains an ID indicating that the IE tells support for trigger multiplex transmission (indicating that the trigger multiplex transmission function is provided).

The Length 302 contains information indicating the length of the data of the IE.

The Trigger Multiplex 303 contains information indicating support for trigger multiplex transmission (for example, trigger multiplex capability (TMC)).

For example, the base station 100 confirms in advance whether each of the slave devices 201 to 203 supports trigger multiplex transmission. For example, the base station 100 can confirm in advance whether each of the slave devices 201 to 203 supports trigger multiplex transmission by causing each of the slave devices 201 to 203 to transmit the IE illustrated in FIG. 3.

Here, it is possible to exchange the IE illustrated in FIG. 3 at the timing when some information is exchanged between the base station 100 and the slave devices 201 to 203. For example, it is possible to exchange the IE illustrated in FIG. 3 at the time that capability is exchanged through a handshake.

As described above, the base station 100 confirms whether each of the slave devices 201 to 203 supports trigger multiplex transmission using the IE illustrated in FIG. 3, and manages the confirmation result. For example, the base station 100 can store and manage the confirmation result in the storage unit 150. For example, the control unit 160 of the base station 100 can manage whether a slave device supports trigger multiplex transmission as a part of the capability information managed in association with each slave device.

[Exemplary Configuration of Traffic Indication Virtual Bitmap (TIVB)]

Figure 4:
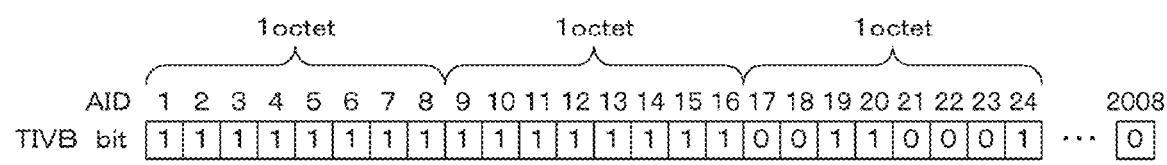
FIG. 4 is a diagram illustrating an exemplary configuration of a TIVB managed by the base station 100 according to the embodiment of the present technology.

FIG. 4 is a diagram illustrating an exemplary configuration of a TIVB managed by the base station 100 according to the embodiment of the present technology. In the example illustrated in FIG. 4, there are 24 slave devices that support trigger multiplex transmission, and association identifiers (AIDs) are assigned to the respective slave devices. As used herein, the AIDs are IDs assigned to the respective slave devices so that the base station 100 manages the respective slave devices.

The AIDs illustrated on the upper side of FIG. 4 indicate the AIDs assigned to the respective slave devices. In addition, TIVB bits illustrated on the lower side of FIG. 4 are bits indicating whether pieces of data addressed to the corresponding AIDs are buffered. Specifically, TIVB bit=1 indicates that data addressed to the corresponding AID are buffered, and TIVB bit=0 indicates that data addressed to the corresponding AID are not buffered.

As illustrated in FIG. 4, it is managed by the TIVB whether data addressed to a slave device that supports trigger multiplex transmission are buffered.

For example, in a case where data addressed to a slave device in the functional suspension state have arrived, the base station 100 temporarily buffers the data and sets the bit corresponding to the AID of the slave device as the destination of the data to one in the TIVB illustrated in FIG. 4.

In addition, the base station 100 regularly or irregularly determines whether data addressed to a slave device in the functional suspension state are buffered in the base station 100. Then, in a case where data addressed to a slave device in the functional suspension state are buffered in the base station 100, the base station 100 tells the fact using a beacon. For example, the fact is included in a traffic information message (TIM, illustrated in FIG. 5) of the beacon and transmitted. Further, the base station 100 can give notification as to whether to cause a plurality of slave devices to transmit triggers for requesting the buffered data.

For example, suppose pieces of data addressed to a plurality of slave devices in the functional suspension state are buffered in the base station 100. In this case, the base station 100 can instruct the plurality of slave devices to multiplex and transmit triggers for requesting the pieces of data addressed to the plurality of slave devices. In the case of such transmission, for example, it is possible to tell the respective slave devices to multiplex and transmit triggers for requesting the pieces of data using the IE illustrated in FIG. 3. Information indicating that triggers for requesting all the pieces of data are multiplexed and transmitted (for example, global non-polling delivery announcement (G-NPDA)) is included in the IE and transmitted.

In addition, the base station 100 may give notification as to whether trigger multiplex transmission is individually performed for data addressed to each AID. For example, the base station 100 can use the TIM included in the beacon to tell a slave device the presence of data addressed to the slave device. Then, the base station 100 can transmit the data at the timing when the slave device is put into the receivable state. Note that the TIM for telling the presence of data is also referred to as a delivery traffic indication message (DTIM).

Figure 5:
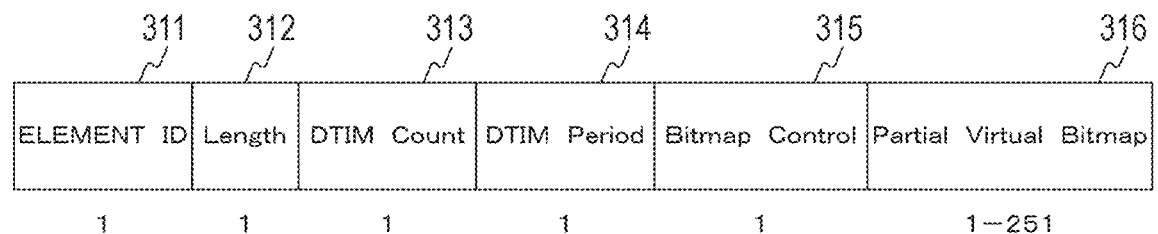
FIG. 5 is a diagram illustrating an example of a frame format of a TIM that is transmitted from the base station 100 to a slave device according to the embodiment of the present technology.
Figure 6:
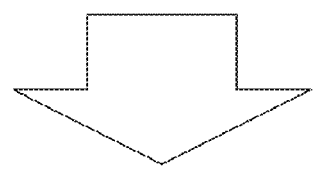
FIG. 6 is a diagram illustrating an example of generating a PVB that is transmitted from the base station 100 to a slave device according to the embodiment of the present technology.

Note that the partial virtual bitmap (PVB) and the frame format of the TIM that are used in the embodiment of the present technology are illustrated in FIGS. 5 and 6.

[Example of Frame Format of TIM]

FIG. 5 is a diagram illustrating an example of the frame format of the TIM that is transmitted from the base station 100 to a slave device according to the embodiment of the present technology.

The frame format of the TIM includes ELEMENT ID 311, Length 312, DTIM Count 313, DTIM Period 314, Bitmap Control 315, and Partial Virtual Bitmap 316.

The ELEMENT ID 311 contains an ID indicating that the IE gives notification to the effect that trigger multiplex transmission is performed.

The Length 312 contains information indicating the length of the data of the TIM frame.

The DTIM Count 313 contains information indicating the number of beacons up to the next beacon.

The DTIM period 314 contains information indicating a value for setting the timing for transmitting the data buffered in the base station 100.

The Bitmap Control 315 contains information about the next field.

The Partial Virtual Bitmap 316 contains the PVB illustrated on the lower side of FIG. 6.

[Example of Generating PVB]

FIG. 6 is a diagram illustrating an example of generating a PVB that is transmitted from the base station 100 to a slave device according to the embodiment of the present technology. Further, the TIVB illustrated on the upper side of FIG. 6 is similar to that of FIG. 4. Further, FIG. 6 illustrates an example of the relationship between the TIVB and the PVB.

In a case where data addressed to each slave device in the functional suspension state are buffered, the base station 100 sets the bit corresponding to the AID of the slave device for which data are buffered to one in the TIVB provided in the base station 100 itself. Consequently, the base station 100 can manage the presence or absence of data and the destination of data. In addition, it is stipulated that the partial virtual bitmap (PVB) which is only a necessary part of the TIVB extracted from the TIVB is told to the slave device using the TIM in the beacon.

In addition, the base station 100 can generate a bitmap on the basis of the PVB used in IEEE 802.11 in the case of giving notification as to whether trigger multiplex transmission is individually performed for data addressed to each AID. For example, in a case where a TIM is transmitted in a beacon, the base station 100 extracts only a necessary part from the TIVB to generate a PVB.

In the example illustrated in FIG. 6, pieces of data addressed to the AIDs=1 to 16, 19, 20, and 24 are buffered in the base station 100. Specifically, in the example illustrated in FIG. 6, in a case where pieces of data information addressed to the slave devices with the AIDs=1 to 24 are included in the PVB, the bits corresponding to the AIDs=1 to 16, 19, 20, and 24 are set to one, and the pieces of data are buffered in the base station 100. In addition, in the example illustrated in FIG. 6, each AID is given notification to the effect that trigger multiplex transmission is performed for the AIDs=1 to 16, 19, 20, and 24. Specifically, in this example, an exemplary bitmap (trigger multiplex bitmap (TMB)) for telling a trigger multiplexing method to be applied to triggers for requesting pieces of data addressed to the respective AIDs will be described on the basis of the PVB illustrated in FIG. 6.

For example, the trigger multiplexing method may be told to all of the AIDs=1 to 24. Specifically, with regard to the AID for which data are buffered, a bitmap containing information necessary for trigger multiplex transmission is created. In addition, with regard to the AID for which data are not buffered, a bitmap containing null data is created.

As used herein, the information necessary for trigger multiplex transmission (trigger multiplex transmission information) is, for example, transmission time and specific information. The specific information is, for example, information about trigger multiplex transmission and information about transmission power for trigger multiplex transmission (transmission power information). In addition, the information about trigger multiplex transmission is, for example, frequency channel information (center frequency and frequency width) for use in frequency multiplexing or matrix index numbers (illustrated in FIGS. 13 and 14) for use in spatial multiplexing.

Note that the AIDs are exchanged in advance between the base station 100 and slave devices. Therefore, even though the AIDs are not transmitted at the time of transmitting the TMB, the slave device can grasp the TMB on the basis of the contents of the PVB exchanged in advance.

In addition, unnecessary information may be deleted from the above-described bitmap so that the bitmap is compressed. For example, it is possible to configure the bitmap with only the bits corresponding to the AIDs for which data are buffered in the base station 100 without arranging the bits corresponding to the AIDs for which data are not buffered in the base station 100. In this case, since the bits corresponding to unnecessary AIDs are deleted, the correspondence relationship between the actually assigned AIDs and the order of bits is broken. However, the slave device can reconfigure the correspondence relationship on the basis of the contents of the original PVB. In this regard, FIG. 7 illustrates an example of deleting the bits corresponding to unnecessary AIDs to generate a bitmap (trigger multiplex bitmap (TMB)) for giving notification to the effect that trigger multiplex transmission is performed.

[Example of Generating TMB on the Basis of PVB]

Figure 7:
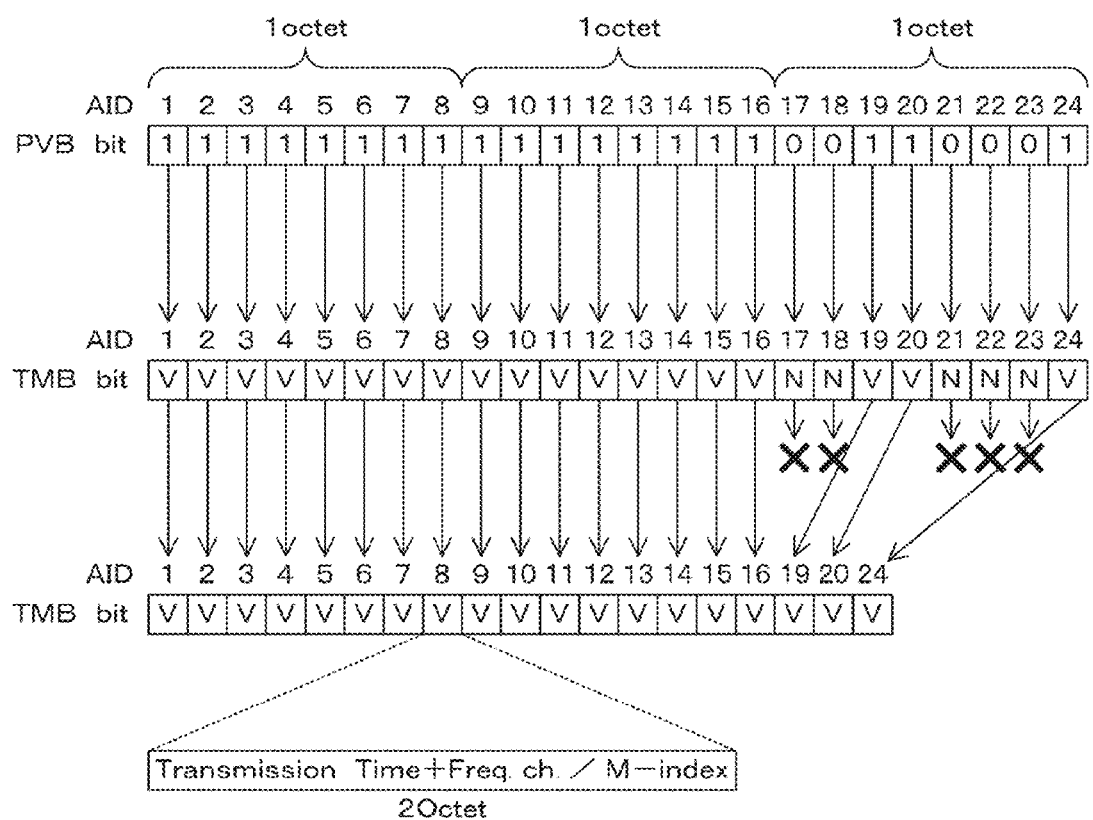
FIG. 7 is a diagram schematically illustrating an example of generating a TMB by the base station 100 according to the embodiment of the present technology.

FIG. 7 is a diagram schematically illustrating an example of generating a TMB by the base station 100 according to the embodiment of the present technology. More specifically, FIG. 7 illustrates an example in which the base station 100 generates a bitmap (TMB) for telling a trigger multiplexing method on the basis of the PVB. Note that, in the TMB of FIG. 7, the bit corresponding to the AID in which valid data exist is indicated by V, and null data are indicated by N. Further, exemplary contents of valid data are illustrated in the AID 8 in the lowest row of FIG. 7.

For example, as illustrated in the middle row of FIG. 7, information necessary for trigger multiplex transmission (for example, transmission time and specific information) may be told to all of the AIDs=1 to 24. Specifically, valid data V are set in the bit string corresponding to the AIDs=1 to 16, 19, 20, and 24 that support trigger multiplex transmission and for which data are buffered in the base station 100. In addition, null data N are set in the bit string corresponding to the AIDs=17, 18, and 21 to 23 for which data are not buffered in the base station 100. In this manner, it is possible to use the bitmap in which the valid data V or null data N are set. In addition, the valid data V include, for example, 20 octets.

As used herein, the valid data are, for example, the information necessary for trigger multiplex transmission described above (for example, transmission time and specific information).

Further, for example, as illustrated in the lowest row of FIG. 7, unnecessary information can be deleted from the bitmap so that the bitmap is compressed.

For example, it is possible to configure the bitmap with only the bit string corresponding to the AIDs for which data are buffered in the base station 100 without arranging the bit string corresponding to the AIDs for which data are not buffered in the base station 100. In this case, since the bit string corresponding to unnecessary AIDs is deleted, the correspondence relationship between the actually assigned AIDs and the order of bits is broken. However, the slave device can reconfigure the correspondence relationship on the basis of the contents of the original PVB. In this manner, it is possible to generate the bitmap (NPIB) for telling the information necessary for trigger multiplex transmission by deleting the bit string (AIDs=17, 18, and 21 to 23) corresponding to the unnecessary AIDs. In this way, in a case where the TMB is generated on the basis of the PVB, data can be compressed.

Here, the trigger multiplexing method told using each of the above-described methods may be used for multiplexing in the exchange of frames such as Acks and data after trigger multiplex transmission. In addition, as a multiplexing method for the exchange of frames after trigger multiplex transmission, a multiplexing method different from the trigger multiplexing method may be told simultaneously with the trigger multiplexing method.

For example, the TMB illustrated in FIG. 7 is extended, so that valid data including the information necessary for trigger multiplex transmission and information required for the exchange of frames after trigger multiplex transmission are stored in each AID. As used herein, the information necessary for trigger multiplex transmission is, for example, the transmission time and specific information described above. Further, the information required for the exchange of frames after trigger multiplex transmission is, for example, information about frame transmission timing (for example, transmission time) and information about the multiplexing method for use in the exchange of frames after trigger multiplex transmission. The information about the multiplexing method is, for example, frequency channels for use in frequency multiplexing or matrix index numbers for use in spatial multiplexing.

Here, for example, instead of telling the information necessary for trigger multiplex transmission to each AID, AIDs having the same trigger multiplex transmission information may be grouped and told the information. This example is illustrated in FIG. 8.

[Bitmap in which AIDs Having Same Trigger Multiplex Transmission Information are Grouped]

Figure 8:
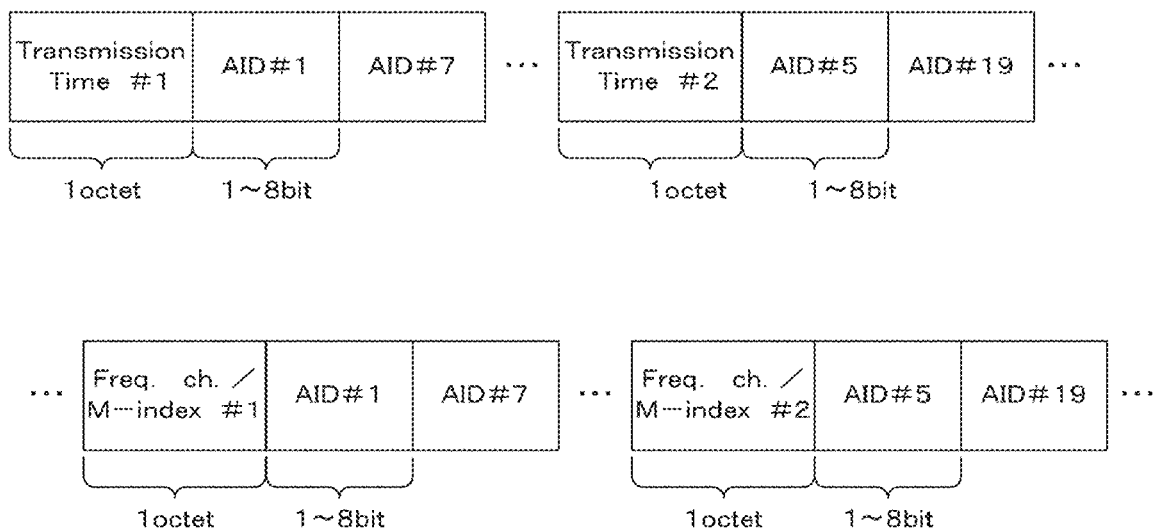
FIG. 8 is a diagram illustrating an example of a bitmap that is transmitted from the base station 100 to a slave device according to the embodiment of the present technology.

FIG. 8 is a diagram illustrating an example of a bitmap that is transmitted from the base station 100 to a slave device according to the embodiment of the present technology.

FIG. 8 illustrates an example of a bitmap in which AIDs having the same trigger multiplex transmission information (information necessary for trigger multiplex transmission) are grouped. Specifically, FIG. 8 illustrates an example in which the AIDs=1 and 7 are a group of AIDs having the same trigger multiplex transmission information, and the AIDs=5 and 19 are a group of AIDs having the same trigger multiplex transmission information.

Here, the maximum number of AIDs is 2008, and 11 bits may be required to indicate that information. In this case, the data size may be larger than that of the bitmap illustrated in FIG. 7. Therefore, for example, in a case where valid data are indicated by 1 octet, it is preferable that the bitmap should be used after the number of AIDs to be given notification to the effect that trigger multiplex transmission is performed is counted in advance and after it is determined in advance whether it can be represented by at least 1 octet or less.

Further, each of the bitmaps described above may be extended within the TIM frame format illustrated in FIG. 5. Further, each of the bitmaps described above may be told using a frame different from the beacon. The frame different from the beacon is, for example, a dedicated frame for telling each of the bitmaps described above, and can be transmitted immediately after the beacon (for example, after a short inter frame space (SIFS)).

[Example of Communication]

Next, examples of communication of data exchanged between a plurality of devices will be described with reference to FIGS. 9 to 12 and 17.

FIGS. 9 to 12 and 17 illustrate examples in which the base station 100 serves as a data transmission source and the slave devices 201 to 203 serve as data transmission destinations. The horizontal axis illustrated in each of FIGS. 9 to 12 and 17 indicates a time axis. In addition, the doze state of each slave device is indicated by a colored rectangle on the lower side of the time axis corresponding to each slave device. In addition, it is assumed that each slave device is in the awake state in a case where it is not in the doze state. Further, a frame transmitted from the base station 100 is indicated by a hollow rectangle on the upper side of the time axis corresponding to the base station 100. In addition, a frame transmitted from each slave device is indicated by a hollow rectangle on the lower side of the time axis corresponding to each slave device. In addition, target beacon transmission time (TBTT) is information about beacon transmission timing.

Further, in the examples illustrated in FIGS. 9 to 12 and 17, it is assumed that information about transmission time and transmission power is told by both the base station 100 and the slave devices. Further, in FIGS. 9 to 12 and 17, frames transmitted at the same time or overlapping frames mean that the frames are multiplexed and transmitted.

[Example of Data Transmission]

Figure 9:
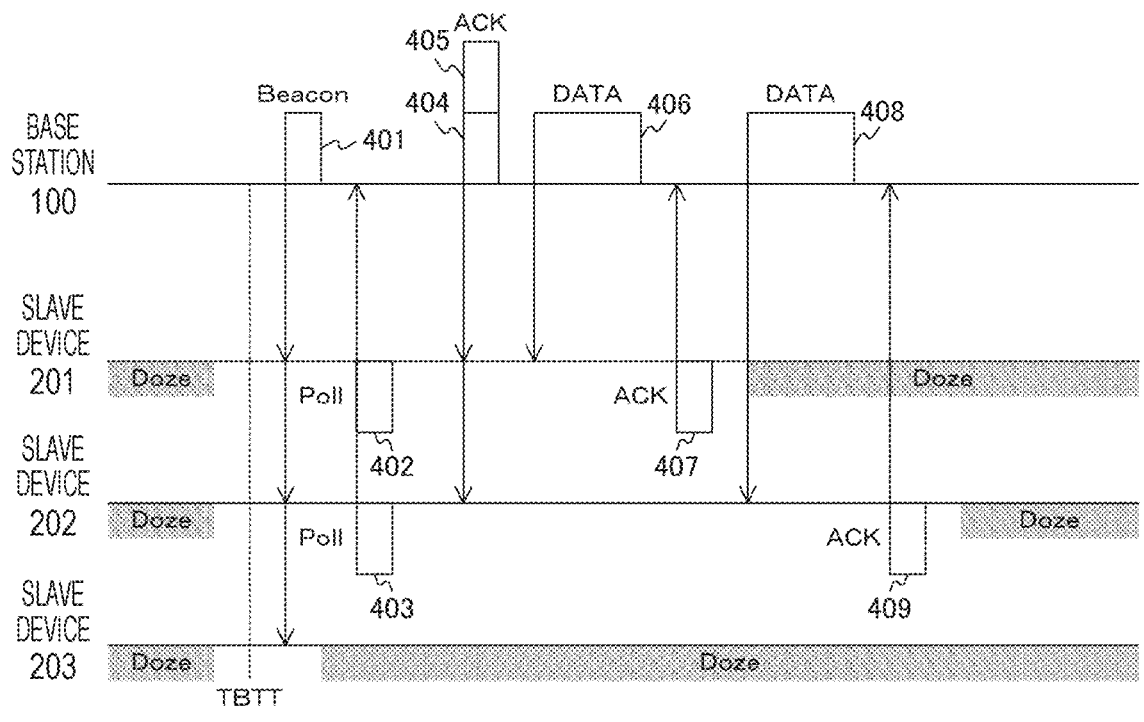
FIG. 9 is a diagram schematically illustrating a flow of data exchanged between devices according to the embodiment of the present technology.
Figure 9:
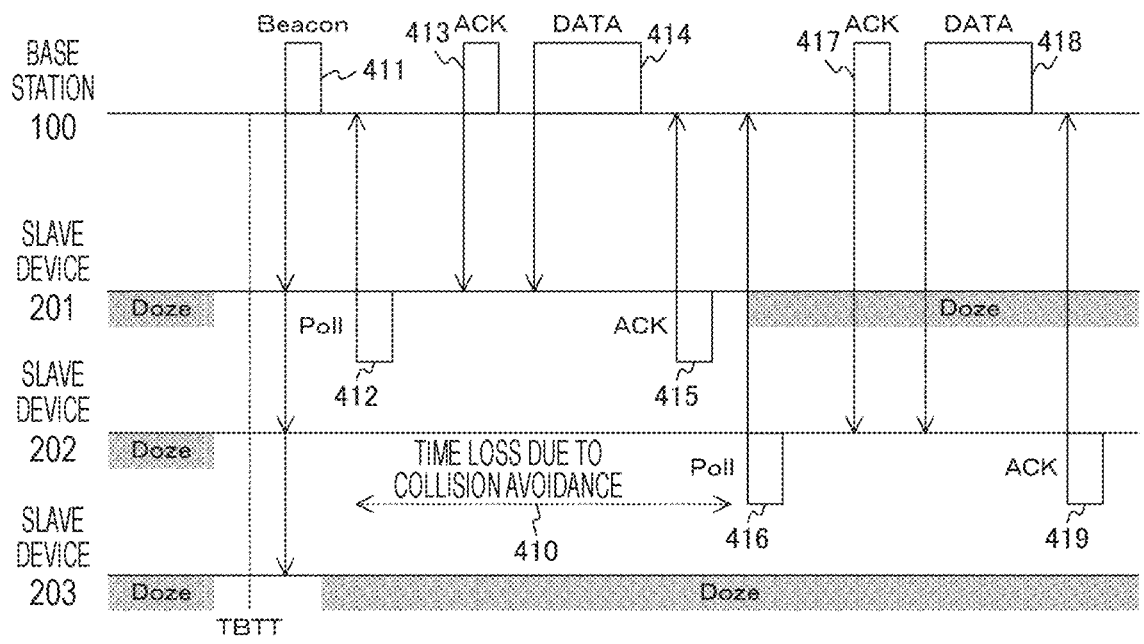
Figure 10:
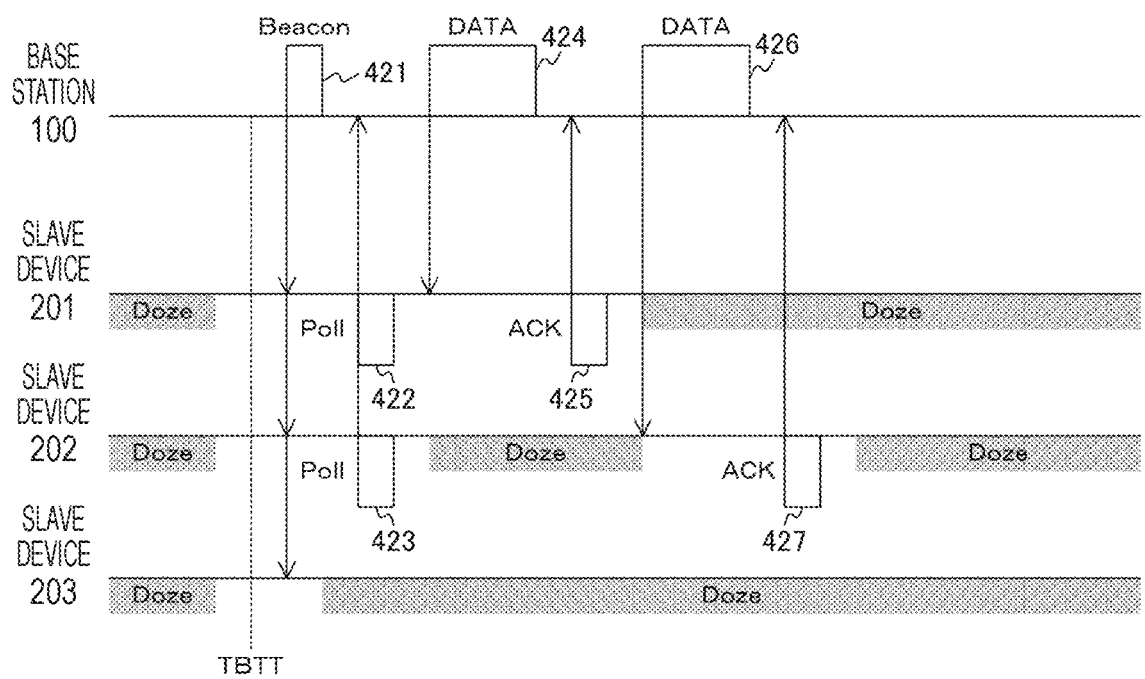
FIG. 10 is a diagram schematically illustrating a flow of data exchanged between devices according to the embodiment of the present technology.

FIGS. 9 and 10 are diagrams schematically illustrating flows of data exchanged between devices according to the embodiment of the present technology.

In the examples illustrated in a of FIG. 9 and FIG. 10, the slave devices 201 and 202 perform trigger multiplex transmission. Further, in b of FIG. 9, an example of performing normal data transmission is illustrated as a comparative example. In addition, in the examples illustrated in a and b of FIG. 9, pieces of data addressed to the slave devices 201 and 202 are buffered in the base station 100.

As illustrated in b of FIG. 9, in a case where the slave devices 201 to 203 do not need to communicate, they can reduce power consumption by shifting from the awake state in which normal operation is performed to the doze state in which signal transmission/reception is not performed.

In addition, each of the slave devices 201 to 203 in the doze state is put into the awake state at regular intervals to confirm whether data addressed to the slave device itself are buffered in the base station 100 using a signal from the base station 100. For example, it can be confirmed using a TIM in a beacon 411.

In this manner, in a case where data addressed to each of the slave devices 201 and 202 are buffered, the slave devices 201 and 202 transmit data request frames (PS-Polls) 412 and 416 to the base station 100. For example, after transmitting the data request frame 412, the slave device 201 receives an ACK 413 in response thereto and receives data 414. Then, the slave device 201 returns to the doze state after transmitting an ACK 415 in response to the data 414.

Note that the PS-Poll is information for telling the awake state and the data transmission request. In addition, the PS-Poll is information that serves as a trigger for causing the base station 100 to transmit data to the slave device. Note that the PS-Poll may be, for example, a frame that tells the end of the functional suspension state.

Further, for example, after transmitting the data request frame 416, the slave device 202 receives an ACK 417 in response thereto and receives data 418. Then, the slave device 202 returns to the doze state after transmitting an ACK 419 in response to the data 418.

As illustrated in b of FIG. 9, in a case where a plurality of slave devices requests data, there is a possibility that a plurality of PS-Polls is transmitted from the plurality of slave devices. Therefore, it is possible to transmit the plurality of PS-Polls at different timings by using a collision avoidance algorithm. However, in a case where the plurality of PS-Polls is transmitted at different timings by using the collision avoidance algorithm, time loss occurs.

For example, upon receiving the data request frame 412 from the slave device 201, the base station 100 transmits the data 414 in response to the data request frame 412. In this case, during the transmission of the data 414, the slave device 202 cannot perform transmission as indicated by an arrow 410. For this reason, it takes the slave device 202 a long time to return to the doze state, and power consumption may increase.

On the other hand, in the embodiment of the present technology, after the base station 100 tells the slave devices the presence of data using a beacon, the plurality of slave devices multiplexes and transmits triggers (PS-Polls). In this case, the base station 100 can simultaneously receive the triggers multiplexed and transmitted from the plurality of slave devices.

In addition, the base station 100 tells the slave devices information about a trigger multiplexing method when telling the slave devices the presence of data using the beacon. In addition, the plurality of slave devices multiplexes and transmits the triggers immediately after receiving the beacon (for example, after an SIFS) without using the collision avoidance algorithm.

More specifically, as illustrated in a of FIG. 9, the base station 100 transmits a beacon 401 (including the TIM illustrated in FIG. 5) to the slave devices 201 to 203. Subsequently, the slave devices 201 and 202 that support multiplex transmission multiplex and transmit triggers 402 and 403. In addition, the base station 100 multiplexes Acks 404 and 405 in response to the triggers 402 and 403, and transmits them to the slave devices 201 and 202. Subsequently, the base station 100 sequentially transmits pieces of data 406 and 408 to the slave devices 201 and 202.

Figure 11:
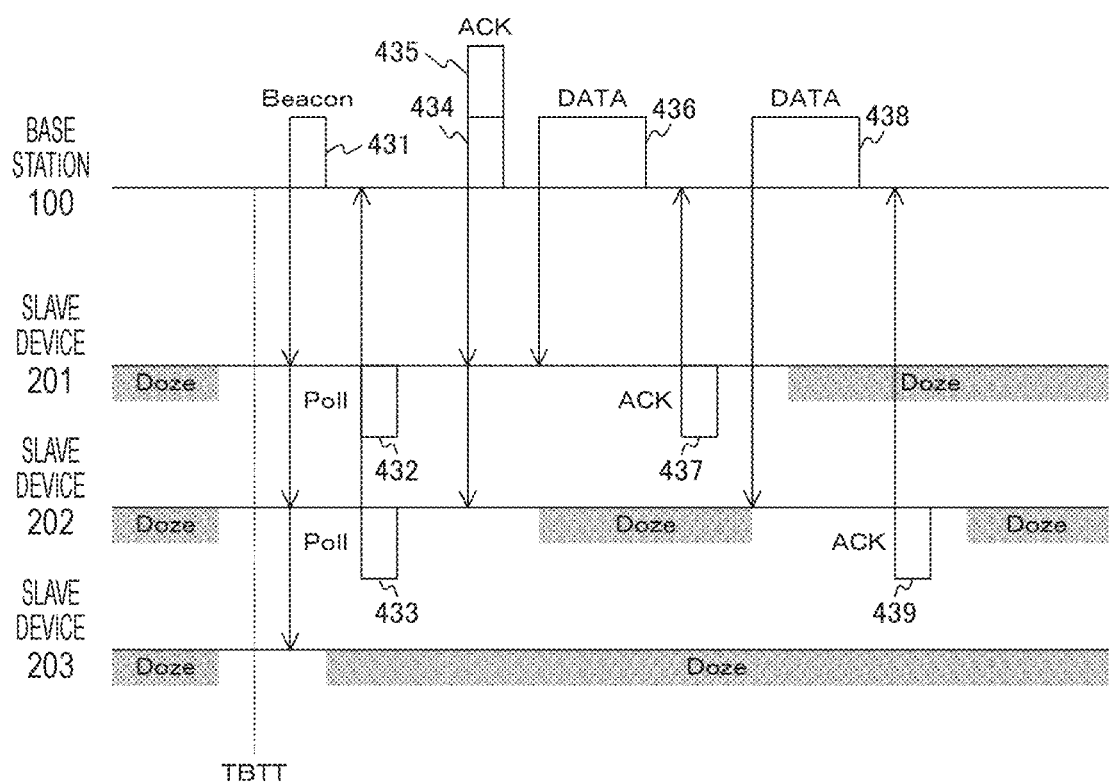
FIG. 11 is a diagram schematically illustrating a flow of data exchanged between devices according to the embodiment of the present technology.

Here, the slave device 201 returns to the doze state after transmitting an ACK 407 in response to the data 406. Further, the slave device 202 returns to the doze state after transmitting an ACK 409 in response to the data 408. Note that the slave device 202 may shift to the doze state after receiving the multiplexed Acks 404 and 405, and may be put into the awake state before the transmission of the data 408 to receive the data 408. This example is illustrated in FIGS. 10, 11, and the like.

FIG. 10 illustrates an example in which the base station 100 does not transmit Acks in response to the triggers from the plurality of slave devices.

More specifically, as illustrated in FIG. 10, the plurality of slave devices 201 and 202 multiplexes and transmits triggers 422 and 423. In addition, the base station 100 transmits pieces of data 424 and 426 to the slave devices 201 and 202 without sending back Acks in response to the triggers 422 and 423.

Here, the slave device 201 returns to the doze state after transmitting an ACK 425 in response to the data 424. In addition, the slave device 202 shifts to the doze state after multiplexing and transmitting the trigger 423, and is put into the awake state before the transmission of the data 426 to receive the data 426. Then, the slave device 202 returns to the doze state after transmitting an ACK 427 in response to the data 426. Note that the timing at which the slave device 202 shifts from the doze state to the awake state after multiplexing and transmitting the trigger 423 can be acquired on the basis of the above-mentioned information required for the exchange of frames after trigger multiplex transmission (for example, information about frame transmission timing).

Note that, as described above, it is assumed that the base station 100 confirms in advance whether each slave device supports trigger multiplex transmission. For example, the base station 100 can confirm whether each slave device supports trigger multiplex transmission as a support confirmation at the time of prior association. Further, for example, the base station 100 can confirm whether each slave device supports trigger multiplex transmission as a response to a request from the base station 100. In addition, for example, the base station 100 can confirm whether the slave device supports trigger multiplex transmission through spontaneous notification from the slave device.

Here, as the trigger multiplexing method, for example, frequency multiplexing (for example, orthogonal frequency division multiple access (OFDMA)) or spatial multiplexing can be used.

In addition, the trigger multiplexing method can be determined on the basis of the slave devices connected to the base station 100. For example, it is possible to determine which multiplexing method is used on the basis of the multiplexing method which the slave devices connected to the base station 100 support. In addition, the multiplexing method may be determined on the basis of the number of slave devices that can perform simultaneous transmission by frequency multiplexing or spatial multiplexing in the target system and the number of slave devices that perform simultaneous transmission. For example, in a case where the number of slave devices that can perform simultaneous transmission by frequency multiplexing is equal to or greater than the number of slave devices that perform simultaneous transmission, but the number of slave devices that can perform simultaneous transmission by spatial multiplexing is less than the number of slave devices that perform simultaneous transmission, then frequency multiplexing is designated as the multiplexing method.

[Example of Trigger Multiplex Transmission and Ack Multiplex Transmission by Frequency Multiplexing]

FIG. 11 is a diagram schematically illustrating a flow of data exchanged between devices according to the embodiment of the present technology. FIG. 11 illustrates an example in which trigger multiplex transmission and Ack multiplex transmission are performed through frequency multiplexing.

First, the base station 100 transmits a beacon 431 (including the TIM illustrated in FIG. 5) to the slave devices 201 to 203. Subsequently, the slave devices 201 and 202 that support multiplex transmission perform frequency multiplexing on triggers 432 and 433 for transmission. In addition, the base station 100 performs frequency multiplexing on Acks 434 and 435 in response to the triggers 432 and 433, and transmits them to the slave devices 201 and 202. Subsequently, the base station 100 transmits pieces of data 436 and 438 to the slave devices 201 and 202.

Here, the slave device 201 returns to the doze state after transmitting an ACK 437 in response to the data 436. In addition, the slave device 202 shifts to the doze state after receiving the multiplexed Acks 434 and 435, and is put into the awake state before the transmission of the data 438 to receive the data 438. Then, the slave device 202 returns to the doze state after transmitting an ACK 439 in response to the data 438.

Figure 12:
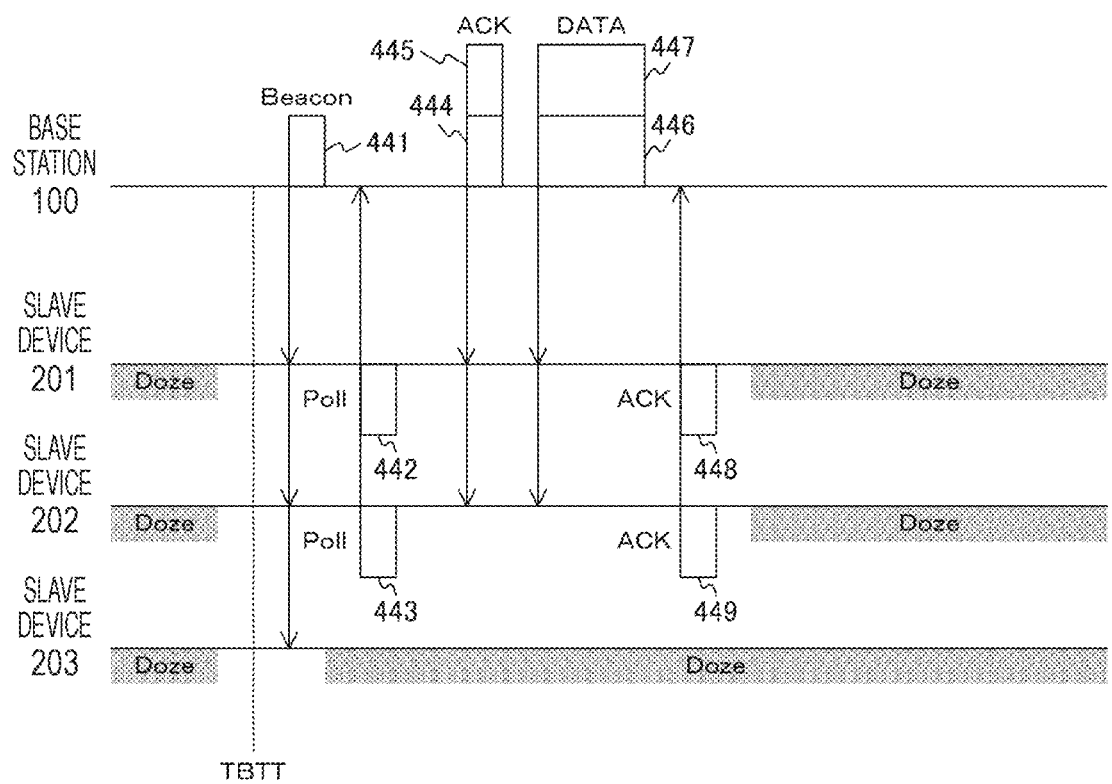
FIG. 12 is a diagram schematically illustrating a flow of data exchanged between devices according to the embodiment of the present technology.

Note that FIG. 11 illustrates the example in which the triggers 432 and 433 and the Acks 434 and 435 are multiplexed and transmitted. However, the method of transmitting Acks and data after trigger multiplex transmission is not limited to the method illustrated in FIG. 11. For example, the pieces of data 436 and 438 may also be multiplexed and transmitted. This example is illustrated in FIG. 12. In addition, for example, the multiplexing method for the triggers 432 and 433 and the multiplexing method for the Acks 434 and 435 may be different from each other.

[Example of Trigger Multiplex Transmission, Ack Multiplex Transmission, and Data Multiplex Transmission by Frequency Multiplexing]

FIG. 12 is a diagram schematically illustrating a flow of data exchanged between devices according to the embodiment of the present technology. FIG. 12 illustrates an example in which trigger multiplex transmission, Ack multiplex transmission, and data multiplex transmission are performed through frequency multiplexing.

First, the base station 100 transmits a beacon 441 (including the TIM illustrated in FIG. 5) to the slave devices 201 to 203. Subsequently, the slave devices 201 and 202 that support multiplex transmission perform frequency multiplexing on triggers 442 and 443 for transmission. In addition, the base station 100 performs frequency multiplexing on Acks 444 and 445 in response to the triggers 442 and 443, and transmits them to the slave devices 201 and 202.

Subsequently, the base station 100 performs frequency multiplexing on pieces of data 446 and 447, and transmits them to the slave devices 201 and 202. Subsequently, the slave devices 201 and 202 perform frequency multiplexing on Acks 448 and 449 in response to the pieces of data 446 and 447, and transmit them to the base station 100.

Here, the multiplexing method for each piece of data (Acks 444 and 445, pieces of data 446 and 447, and Acks 448 and 449) after the multiplex transmission of the triggers 442 and 443 will be described. The multiplexing method for each piece of data after the multiplex transmission of the triggers 442 and 443 may be a frequency multiplexing method similar to the multiplexing method for the triggers 442 and 443 or a frequency multiplexing method different from the multiplexing method for the triggers 442 and 443. In this way, in a case where the multiplexing method is different from the multiplexing method for the triggers 442 and 443, the different multiplexing method is told to each slave device through the above-mentioned information required for the exchange of frames after trigger multiplex transmission.

In this manner, it is possible to perform frequency multiplexing on Acks and data after trigger multiplex transmission on the basis of the frequency multiplexing method told together with the information necessary for trigger multiplex transmission or on the basis of the frequency multiplexing method separately told.

[Example of Spatial Multiplex Transmission]

Here, the matrix and matrix index numbers for use in spatial multiplex transmission will be described. In addition, in the example described here, an encoding matrix including four rows and four columns is used as indicated in Formula 1 below.

[Mathmatical Formula 1]

$$\begin{pmatrix} 1 & -1 & 1 & 1 \\ 1 & 1 & -1 & 1 \\ 1 & 1 & 1 & -1 \\ -1 & 1 & 1 & 1 \end{pmatrix} \quad \text{Formula 1}$$

For example, in a case where triggers from n slave devices are spatially multiplexed, an encoding matrix including n columns and n rows is prepared as information known to both the base station and the slave devices. However, in a case where each slave device uses a plurality of spatial streams, a value obtained on the basis of the number of slave devices and the number of spatial streams used by each slave device (total number of spatial streams used by the respective slave devices) is set as n. In addition, in a case where n is an odd number of three or more, an even number larger than the odd number by one is set as n.

In the example described here, for ease of explanation, it is assumed that four slave devices are multiplexed and n=4 is satisfied. An exemplary encoding matrix including four rows and four columns is indicated in Formula 1.

For example, in a case where each of two slave devices A and B uses one spatial stream (SSA and SSB), and another slave device C uses two spatial streams (SSC1 and SSC2), then n=4 is satisfied.

Further, for example, in a case where one slave device D uses one spatial stream (SSD), and another slave device E uses two spatial streams (SSD1 and SSD2), then n=3 is satisfied. In this case, however, since n is an odd number of three or more, an even number (4) larger than the odd number (3) by one is set as n, and thus n=4 is satisfied.

In addition, for ease of explanation, a matrix including n columns and n rows is denoted by M, and an element in the i-th row and j-th column is denoted by $M_{ij}$. For example, $M_{23}$ indicates an element in the second row and third column.

In a case where triggers from four slave devices are spatially multiplexed, four long training fields (LTFs) 1 to 4, or first to fourth LTFs, are added to the head of the frame of each trigger. These four LTFs are common to all the slave devices, and also known to the base station. Out of these four slave devices, one slave device is assigned an i-th row of the M matrix. In this case, the assigned i-th row includes four elements, and the four LTFs 1 to 4, or first to fourth LTFs, are multiplied in this order by the four elements ($M_{i1}$ to $M_{i4}$), or first to fourth elements.

Similarly, the other slave devices are assigned different rows, and the respective LTFs are multiplied by the respective elements in a similar manner.

Figures 13, 14:
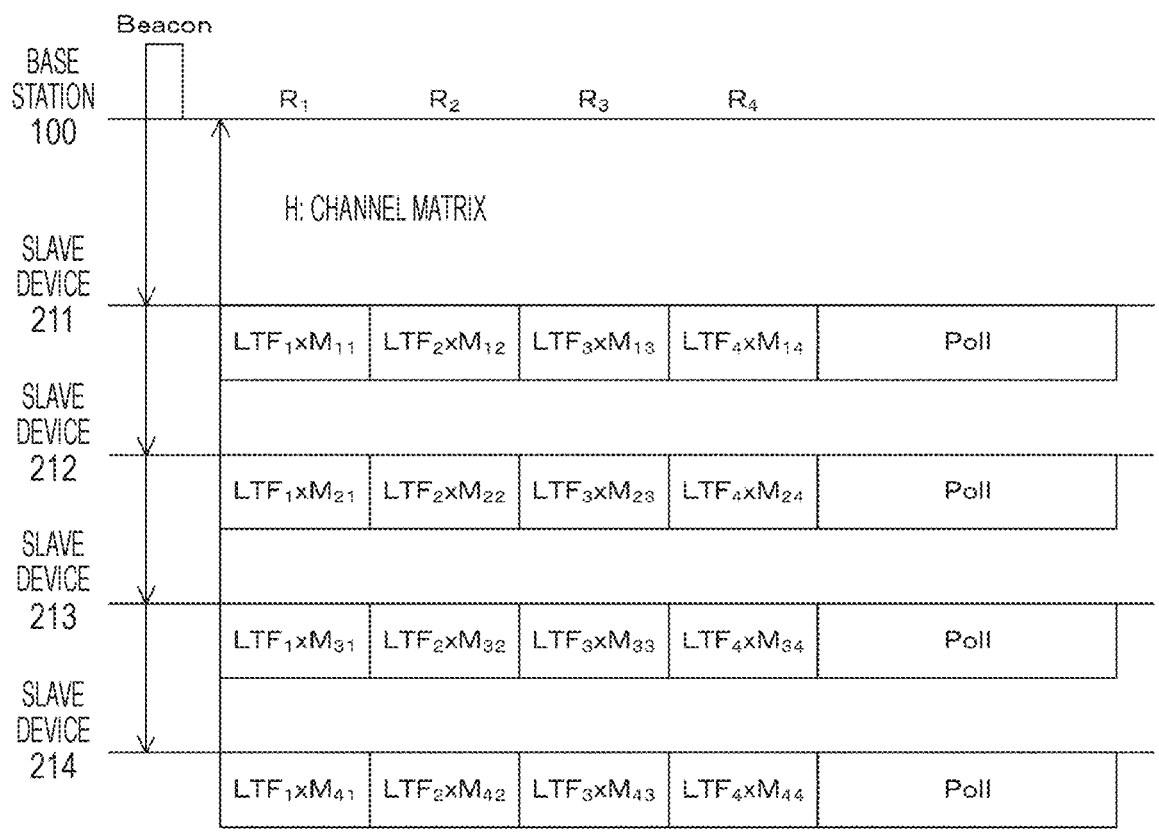
FIG. 13 is a diagram schematically illustrating a flow of data exchanged between devices according to the embodiment of the present technology.
FIG. 14 is a diagram illustrating a flow for independently separating a channel matrix into respective elements by the base station 100 according to the embodiment of the present technology.

In the example illustrated in FIG. 13, the LTFs and the encoding matrix are multiplied assuming that slave devices 211 to 214 serve as the four slave devices.

[Example of Encoded Frame for Spatial Multiplex Transmission]

FIG. 13 is a diagram schematically illustrating a flow of data exchanged between devices according to the embodiment of the present technology.

In FIG. 13, R1 to R4 indicate received signals in the base station 100, and indicate received signals in the time slots corresponding to the first to fourth LTFs. In short, Rn means a received signal of the base station 100 in the n-th time slot. In addition, H indicates a channel matrix from the slave devices 211 to 214 to the base station 100.

Here, the base station 100 can independently separate the channel matrix H into the respective elements by adding or subtracting the four received signals R1 to R4. In addition, the base station 100 can extract the original signal by multiplying the received signal by the inverse matrix of the separated channel matrix. In this regard, FIG. 14 illustrates a flow of independently separating the channel matrix H into the respective elements.

[Example of Independently Separating Channel Matrix into Respective Elements]

FIG. 14 is a diagram illustrating a flow for independently separating the channel matrix into the respective elements by the base station 100 according to the embodiment of the present technology.

In this manner, the base station 100 can perform spatial multiplexing by telling each slave device the row number of the encoding matrix. For example, the base station 100 tells the row number as the matrix index number and as multiplexing method information.

In addition, the matrix index numbers are assigned not only to the respective slave devices but also to the respective spatial streams used by the respective slave devices. For example, suppose each of two slave devices A and B uses one spatial stream (SSA and SSB), and one slave device C uses two spatial streams (SSC1 and SSC2). In this case, the matrix index numbers are assigned to SSA, SSB, SSC1, and SSC2. In other words, the slave device C is assigned two matrix index numbers in total.

In addition, in a case where the number of spatial streams for spatial multiplexing is an odd number of three or more, encoded LTFs are provided such that the number of encoded LTFs is equal to an even number larger than the odd number by one. In this case, since the matrix index number is larger than the number of spatial streams by one, the remaining one matrix index number remains unassigned to any spatial stream. In this manner, a part of the encoding matrix is lost. However, if the number of rows of encoding matrix information which can be received by the base station 100 is equal to the number of spatial streams, the base station 100 can extract the signal.

Further, as the frame illustrated in FIG. 13, it is possible to use a frame for telling a slave device which cannot understand the trigger multiplex transmission function that it cannot understand the trigger multiplex transmission function. An exemplary configuration of this frame is illustrated in each of FIGS. 15 and 16.

[Exemplary Configuration of Frame]

Figure 15:
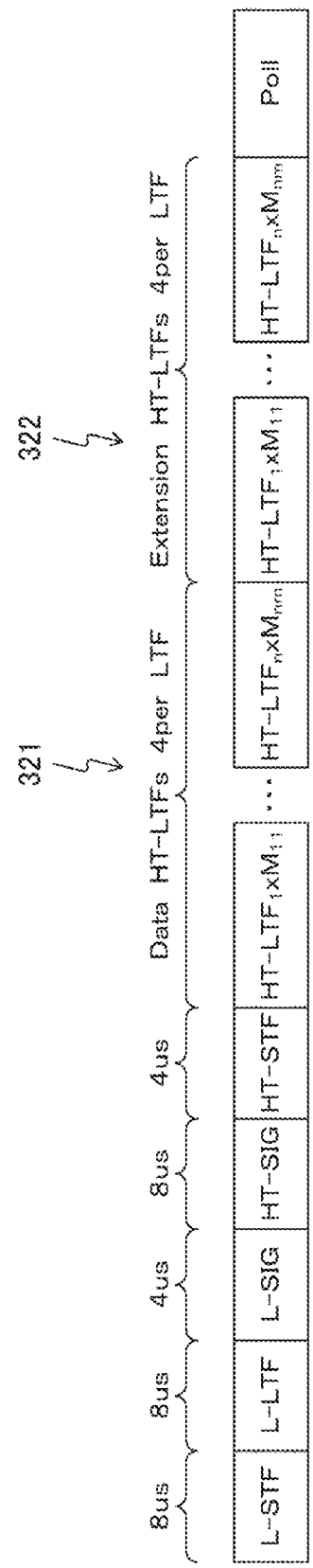
FIG. 15 is a diagram illustrating an exemplary configuration of a frame that is transmitted from the base station 100 to a slave device according to the embodiment of the present technology.
Figure 16:
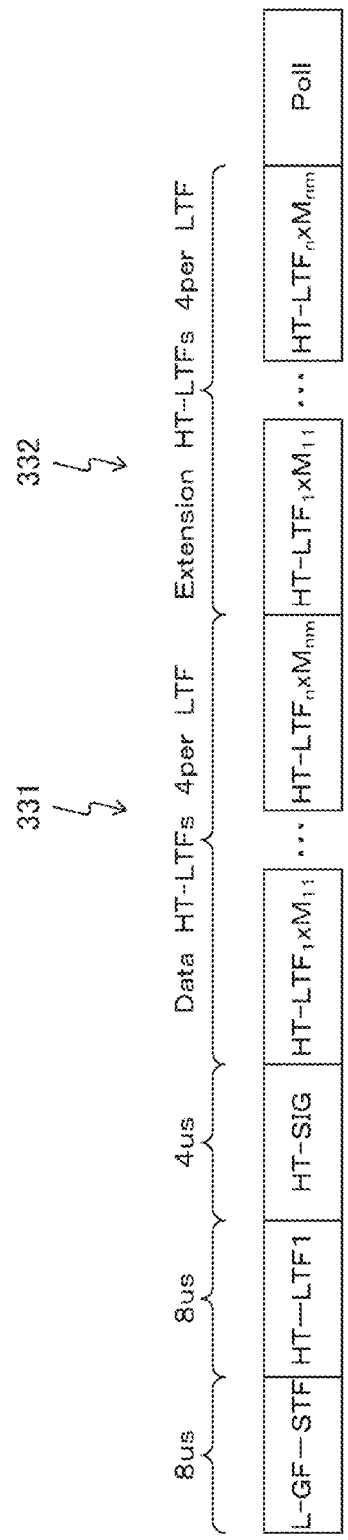
FIG. 16 is a diagram illustrating an exemplary configuration of a frame that is transmitted from the base station 100 to a slave device according to the embodiment of the present technology.

Each of FIGS. 15 and 16 is a diagram illustrating an exemplary configuration of a frame that is transmitted from the base station 100 to a slave device according to the embodiment of the present technology.

FIG. 15 illustrates an exemplary encoded LTF frame in which the configuration of high throughput (HT)-mixed format physical layer convergence protocol (PLCP) protocol data unit (PPDU) specified in IEEE 802.11 is adopted.

In FIG. 15, the encoded LTFs correspond to the portions indicated by Data HT-LTFs (321) and Extension HT-LTFs (322).

FIG. 16 illustrates an exemplary encoded LTF frame in which the configuration of HT-greenfield format PPDU specified in IEEE 802.11 is adopted.

In FIG. 16, the encoded LTFs correspond to the portions indicated by Data HT-LTFs (331) and Extension HT-LTFs (332).

[Example of Trigger Multiplex Transmission by Spatial Multiplexing]

Figure 17:
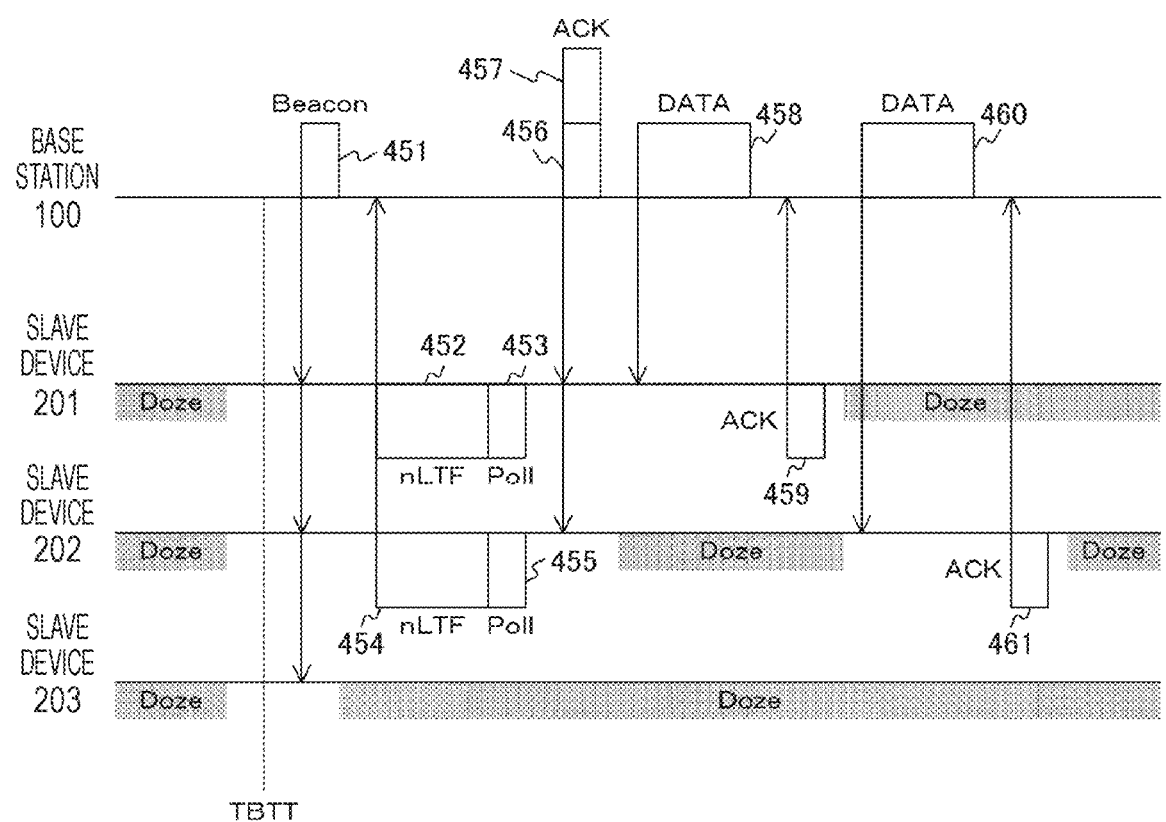
FIG. 17 is a diagram schematically illustrating a flow of data exchanged between devices according to the embodiment of the present technology.

FIG. 17 is a diagram schematically illustrating a flow of data exchanged between devices according to the embodiment of the present technology. FIG. 17 illustrates an example in which trigger multiplex transmission is performed through spatial multiplexing.

In FIG. 17, each of rectangles 452 and 454 indicating frames means long training fields (LTFs) including n fields containing partial information of a matrix including n columns and n rows corresponding to the number n of slave devices for multiplexing.

First, the base station 100 transmits a beacon 451 (including the TIM illustrated in FIG. 5) to the slave devices 201 to 203. Subsequently, the slave devices 201 and 202 that support multiplex transmission spatially multiplex and transmit triggers 452 to 455 including the nLTFs.

Here, in a case where Acks or data are transmitted from the base station 100 to a plurality of slave devices, Acks or data may be multiplexed and transmitted using another multiplexing method instead of being spatially multiplexed and transmitted. For example, the base station 100 performs frequency multiplexing on Acks 456 and 457 in response to the triggers 452 to 455, and transmits them to the slave devices 201 and 202.

Subsequently, the base station 100 transmits pieces of data 458 and 460 to the slave devices 201 and 202. Subsequently, the slave devices 201 and 202 transmit Acks 459 and 461 to the base station 100 in response to the pieces of data 458 and 460. Note that a part or all of the frames (e.g., Acks and data) subsequent to the triggers may be multiplexed and transmitted as described above.

In the examples illustrated in FIGS. 9 to 12 and 17, the method of transmitting the frames (e.g., Acks and data) subsequent to the multiplexed triggers is not limited to the methods illustrated in FIGS. 9 to 12 and 17. For example, with regard to Acks from the base station 100 in response to the triggers from slave devices, Acks may be sequentially and continuously transmitted to one or more slave devices, or Acks addressed to a plurality of different slave devices may be concatenated for transmission. Alternatively, Acks may be subjected to frequency multiplexing or spatial multiplexing for transmission, Acks may be transmitted in response to Ack requests, or a frame including information indicating that Acks are addressed to a plurality of slave devices may be transmitted.

Figure 18:
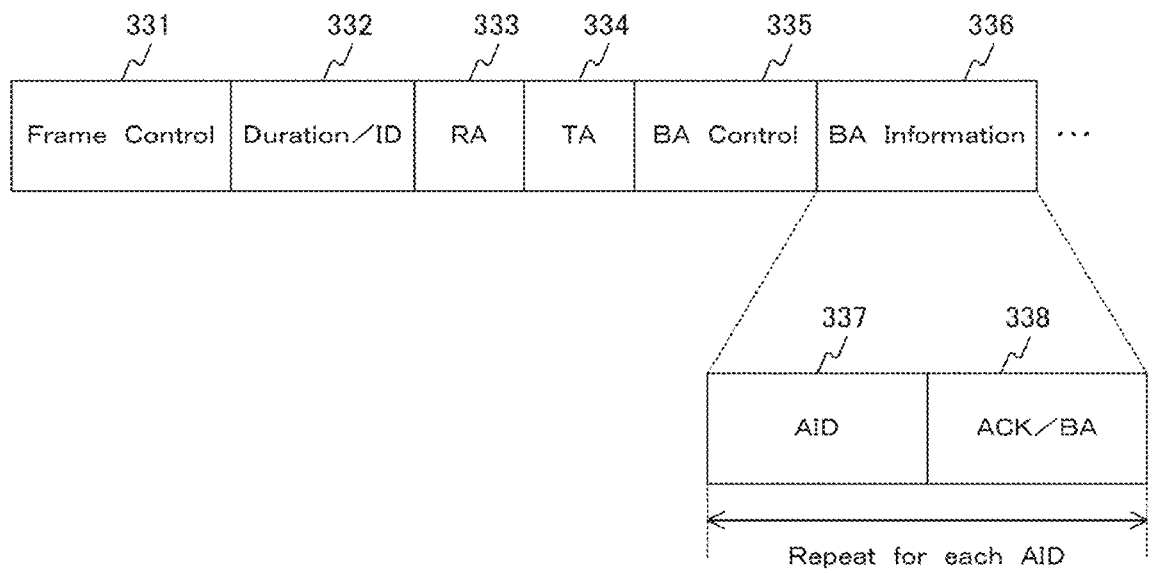
FIG. 18 is a diagram illustrating an exemplary configuration of a frame that is transmitted from the base station 100 to a slave device according to the embodiment of the present technology.

In addition, with regard to the frame including information indicating that Acks are addressed to a plurality of slave devices, one or more slave devices may request transmission with that frame. FIG. 18 illustrates an example of the frame including information indicating that Acks are addressed to a plurality of slave devices.

[Example of Frame Including Information Indicating that Acks are Addressed to a Plurality of Slave Devices]

FIG. 18 is a diagram illustrating an exemplary configuration of a frame that is transmitted from the base station 100 to a slave device according to the embodiment of the present technology.

The frame illustrated in FIG. 18 includes Frame Control 331, Duration/ID 332, Receiver Address (RA) 333, Transmitter Address (TA) 334, BA Control 335, BA Information 336, AID 337, and ACK/BA 338.

The Frame Control 331 contains information indicating that the frame includes information indicating that Acks are addressed to a plurality of slave devices.

The Duration/ID 332 contains information indicating the duration of the frame.

The RA 333 may contain information indicating the address of the destination device. In this case, information indicating that Acks are addressed to a plurality of slave devices may be contained.

The TA 334 contains information indicating the address of the transmission source device.

The BA Control 335 contains information about the frame (for example, identifier of the frame).

The BA Information 336 includes at least an AID 337 as a destination of the Ack and a field (ACK/BA 338) indicating Ack/BA. Further, as illustrated in FIG. 18, a field indicating at least an AID may be repeatedly arranged in the BA information 336 so that the number of repeats is equal to the number of AIDs.

Here, the timing for performing frequency multiplex communication (for example, OFDMA) or spatial multiplex communication will be described. In a case where frequency multiplex communication or spatial multiplex communication is performed, for example, it is preferable to perform the frequency multiplex communication or spatial multiplex communication immediately after the cancellation of the functional suspension state.

For example, suppose the previous state is not the functional suspension state but a normal state. In this case, how many pieces of data addressed to a plurality of slave devices are buffered in the base station 100 at a certain time are determined on the basis of the probability that data addressed to each slave device are delivered from an upper layer of the base station 100 corresponding to each traffic. Therefore, the efficiency of using multiplexing for a plurality of slave devices varies according to traffic conditions. In another case, pieces of data addressed to a plurality of slave devices need to be buffered by inserting unnecessary delays, which may result in inefficiency.

However, immediately after the respective slave devices cancel the functional suspension state, pieces of data addressed to the respective slave devices that have been in the functional suspension state are normally buffered in the base station 100. Therefore, immediately after the functional suspension state, there is a high possibility that pieces of data addressed to a plurality of slave devices are buffered, and it can be considered that efficiency is improved with the use of multiplexing.

[Communication Example in which Slave Devices Having Multiplexing Functions and Legacy Device Coexist]

Figure 19:
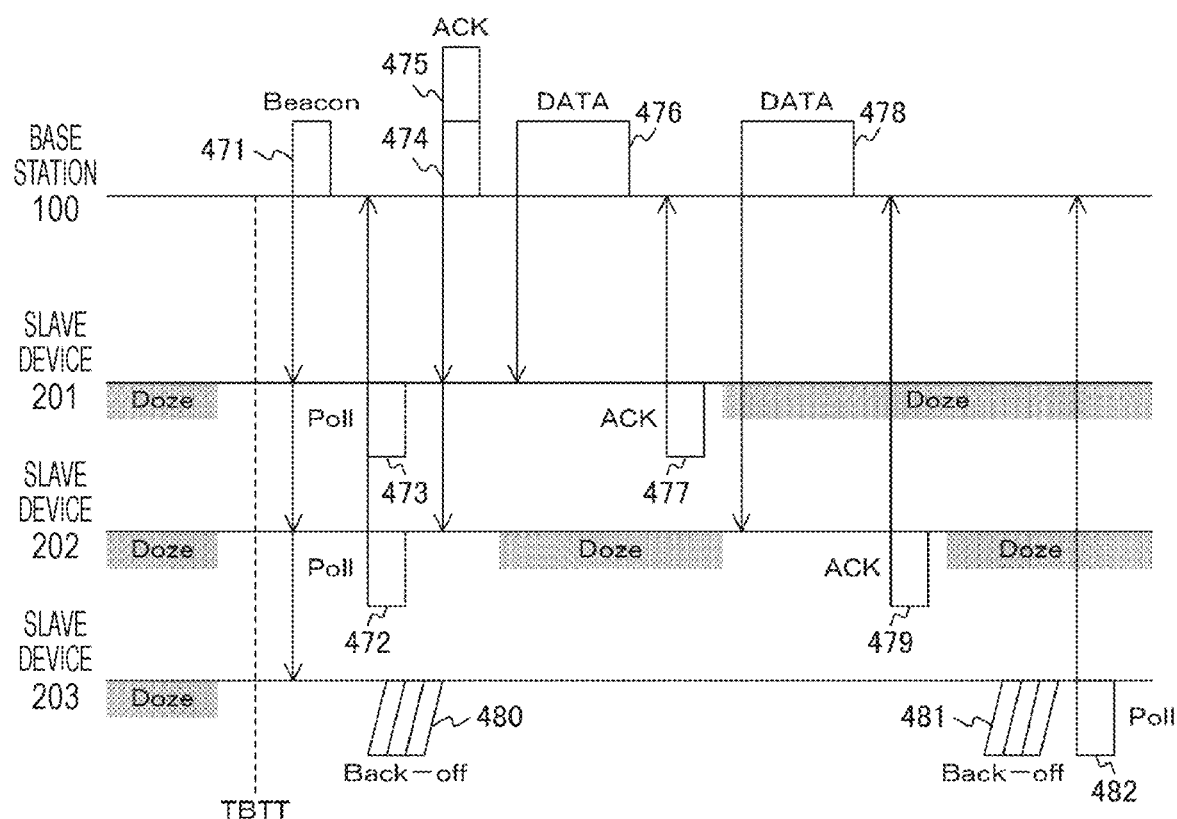
FIG. 19 is a diagram schematically illustrating a flow of data exchanged between devices according to the embodiment of the present technology.

FIG. 19 is a diagram schematically illustrating a flow of data exchanged between devices according to the embodiment of the present technology. FIG. 19 illustrates an example in which slave devices having multiplexing functions and a legacy device coexist. Specifically, FIG. 19 illustrates an example in which the slave device 203 is a slave device (legacy device) that does not have a trigger multiplex transmission function. Note that, in FIG. 19, the random back-off period is schematically indicated by a plurality of trapezoids.

First, the base station 100 transmits a beacon 471 (including the TIM illustrated in FIG. 5) to the slave devices 201 to 203. Subsequently, the slave devices 201 and 202 that support multiplex transmission multiplex and transmit triggers 472 and 473. In addition, the base station 100 multiplexes Acks 474 and 475 in response to the triggers 472 and 473, and transmits them to the slave devices 201 and 202.

In this manner, the multiplexed triggers 472 and 473 are transmitted immediately after the reception of the beacon (for example, after an SIFS) without using the collision avoidance algorithm (random back-off).

Subsequently, the base station 100 transmits pieces of data 476 and 478 to the slave devices 201 and 202. Subsequently, the slave devices 201 and 202 transmit Acks 477 and 479 to the base station 100 in response to the pieces of data 476 and 478.

In addition, the slave device 203, which is a legacy device, transmits a trigger (PS-Poll) 482 using the collision avoidance algorithm (random back-off 480 and 481). Specifically, the slave device 203 transmits the trigger (PS-Poll) 482 after a predetermined period of time (distributed inter frame space (DIFS) (>SIFS)+random back-off) elapses after the reception of the beacon.

In this manner, the slave devices 201 and 202 having the trigger multiplex transmission functions multiplex and transmit the triggers 472 and 473 immediately after receiving the beacon (for example, after an SIFS) without using the collision avoidance algorithm (random back-off). On the other hand, the slave device 203, which is a legacy device, transmits the trigger 482 using the collision avoidance algorithm (random back-off 480 and 481).

Therefore, the slave devices having the trigger multiplex transmission functions can start the exchange of frames preferentially. In addition, the legacy device starts the exchange of frames after the exchange of frames by the slave devices having the multiplexing functions.

[Example of Operation of Base Station]

Figure 20:
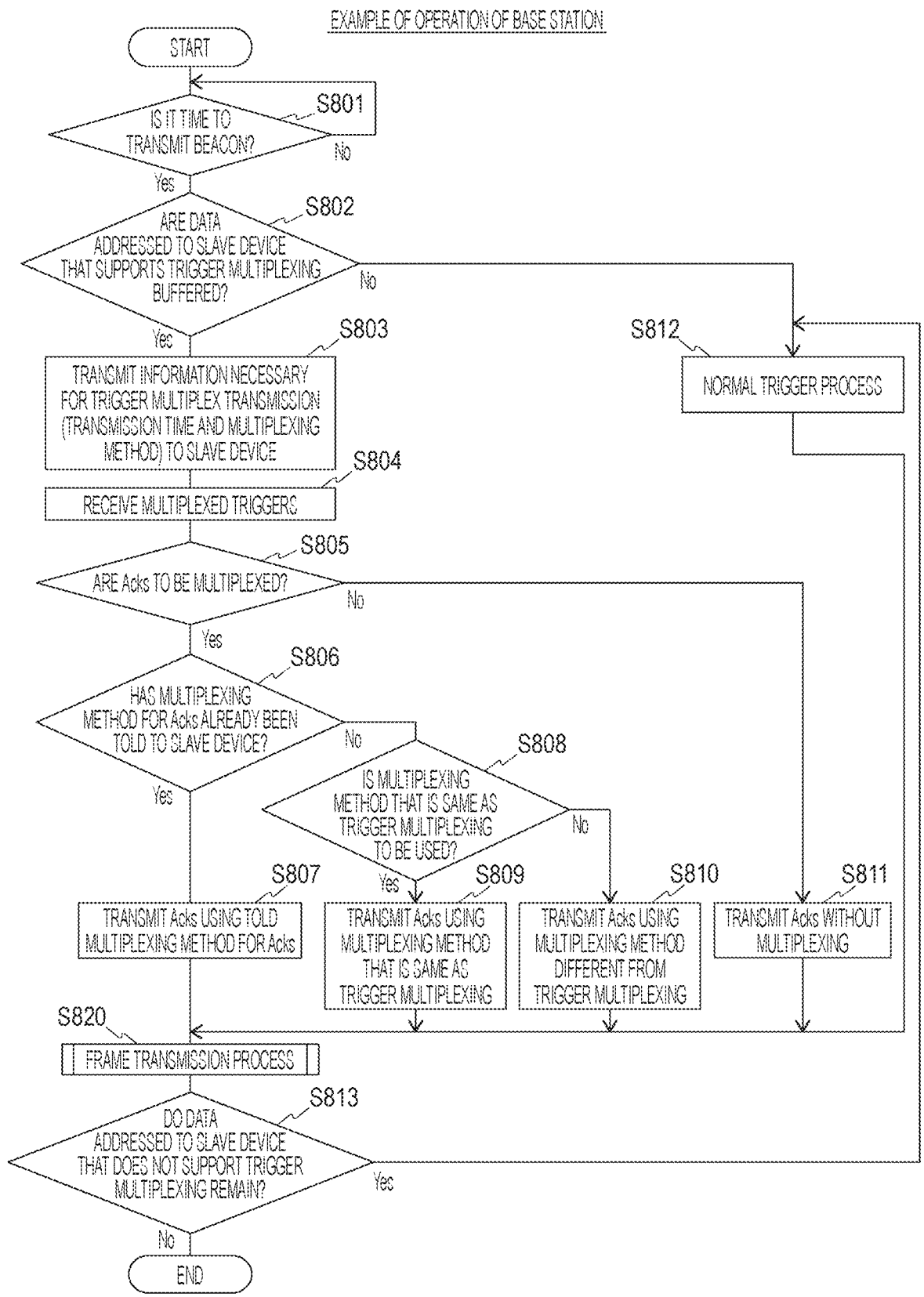
FIG. 20 is a flowchart illustrating an example of a processing procedure for a data transmission process by the base station 100 according to the embodiment of the present technology.

FIG. 20 is a flowchart illustrating an example of a processing procedure for a data transmission process by the base station 100 according to the embodiment of the present technology.

It is assumed that the base station 100 regularly or irregularly receives, from a slave device, information about the period during which the slave device is in the functional suspension state (functional suspension period). Further, it is assumed that the control unit 160 of the base station 100 sequentially receives, from an upper layer, pieces of data addressed to slave devices in the functional suspension state.

First, the control unit 160 of the base station 100 determines whether it is time to transmit a beacon (step S801). In a case where it is not time to transmit a beacon (step S801), monitoring is continued.

In a case where it is time to transmit a beacon (step S801), the control unit 160 determines whether data addressed to a slave device that supports trigger multiplexing are buffered (step S802).

In a case where data addressed to a slave device that supports trigger multiplexing are buffered (step S802), the control unit 160 transmits information necessary for trigger multiplex transmission to the slave device (step S803). Here, the information necessary for trigger multiplex transmission is, for example, the transmission time and the multiplexing method. Note that steps S801 to S803 are an example of a control step of telling described in the claims.

Subsequently, the control unit 160 receives multiplexed triggers from the respective slave devices to which the information necessary for trigger multiplex transmission has been transmitted (step S804). Subsequently, the control unit 160 determines whether the setting specifies that Acks are to be multiplexed and transmitted (step S805).

In a case where the setting specifies that Acks are to be multiplexed and transmitted (step S805), the control unit 160 determines whether the multiplexing method for Acks has already been told to each slave device (step S806). In a case where the multiplexing method for Acks has already been told to each slave device (step S806), the control unit 160 multiplexes and transmits Acks using the multiplexing method for Acks told to each slave device (step S807).

In a case where the multiplexing method for Acks has not yet been told to each slave device (step S806), the control unit 160 determines whether the setting specifies that Acks are to be multiplexed and transmitted using the method that is the same as the multiplexing method for trigger multiplex transmission (step S808). Note that the multiplexing method for trigger multiplex transmission has been told to each slave device as the information necessary for trigger multiplex transmission. In addition, for example, in a case where the multiplexing method for trigger multiplex transmission is frequency multiplexing, the multiplexing method for Ack multiplex transmission can be the same frequency multiplexing.

In a case where the setting specifies that Acks are to be multiplexed and transmitted using the method that is the same as the multiplexing method for trigger multiplex transmission (step S808), the control unit 160 multiplexes and transmits Acks using the method that is the same as the multiplexing method for trigger multiplex transmission (step S807).

In a case where the setting does not specify that Acks are to be multiplexed and transmitted using the method that is the same as the multiplexing method for trigger multiplex transmission (step S808), the control unit 160 multiplexes and transmits Acks using a method different from the multiplexing method for trigger multiplex transmission (step S810). For example, the control unit 160 can multiplex and transmit Acks using a multiplexing method through which the slave devices are implicitly expected to be able to receive the Acks.

In a case where the setting does not specify that Acks are to be multiplexed and transmitted (step S805), the control unit 160 transmits Acks without multiplexing (step S811).

In a case where data addressed to a slave device that supports trigger multiplexing are not buffered (step S802), the control unit 160 performs a normal trigger process (step S812).

After the Ack transmission process is performed (steps S807, S809, S810, and S811), or after the normal trigger process is performed (step S812), a frame transmission process is performed (step S820). This frame transmission process will be described in detail with reference to FIG. 21.

Subsequently, the control unit 160 determines whether data addressed to a slave device that does not support trigger multiplexing exist (step S813). Then, in a case where data addressed to a slave device that does not support trigger multiplexing exist (step S813), the process returns to step S812, and the normal trigger process is performed.

In a case where data addressed to a slave device that does not support trigger multiplexing do not exist (step S813), the operation of the data transmission process is terminated.

[Example of Frame Transmission Process]

Figure 21:
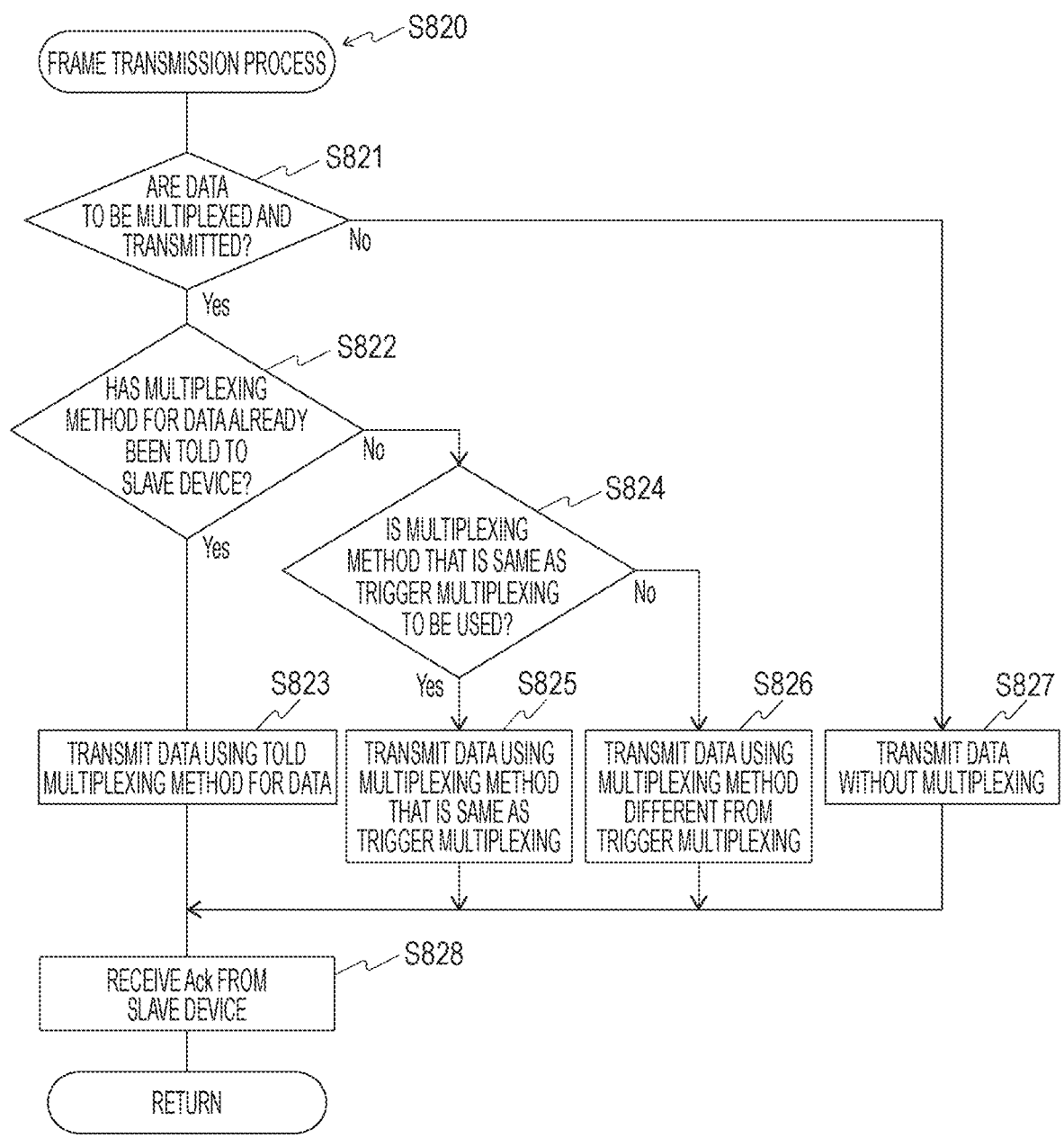
FIG. 21 is a flowchart illustrating an example of a frame transmission process of the data transmission process by the base station 100 according to the embodiment of the present technology.

FIG. 21 is a flowchart illustrating an example of the frame transmission process (step S820 illustrated in FIG. 20) of the data transmission process by the base station 100 according to the embodiment of the present technology.

First, the control unit 160 determines whether the setting specifies that data are to be multiplexed and transmitted (step S821). In a case where the setting specifies that data are to be multiplexed and transmitted (step S821), the control unit 160 determines whether the multiplexing method for data has already been told to each slave device (step S822).

In a case where the multiplexing method for data has already been told to each slave device (step S822), the control unit 160 multiplexes and transmits data using the multiplexing method for data told to each slave device (step S823).

In a case where the multiplexing method for data has not yet been told to each slave device (step S822), the control unit 160 determines whether the setting specifies that data are to be multiplexed and transmitted using the method that is the same as the multiplexing method for trigger multiplex transmission (step S824). Note that the multiplexing method for trigger multiplex transmission has been told to each slave device as the information necessary for trigger multiplex transmission.

In a case where the setting specifies that data are to be multiplexed and transmitted using the method that is the same as the multiplexing method for trigger multiplex transmission (step S824), the control unit 160 multiplexes and transmits data using the method that is the same as the multiplexing method for trigger multiplex transmission (step S825).

In a case where the setting does not specify that data are to be multiplexed and transmitted using the method that is the same as the multiplexing method for trigger multiplex transmission (step S824), the control unit 160 multiplexes and transmits data using a method different from the multiplexing method for trigger multiplex transmission (step S826). For example, the control unit 160 can multiplex and transmit data using a multiplexing method through which the slave devices are implicitly expected to be able to receive the data.

In a case where the setting does not specify that data are to be multiplexed and transmitted (step S821), the control unit 160 transmits data without multiplexing (step S827).

After the data transmission process is performed (steps S823 and S825 to S827), the control unit 160 receives an Ack in response to the transmitted data from each slave device (step S828).

Here, in a case where it is difficult to tell the Ack multiplexing method in advance, or in a case where overhead corresponding to that information cannot be tolerated, it is desirable to use a frame that may be received even without advance notice (for example, frame illustrated in FIG. 18).

[Example of Operation of Slave Device]

Figure 22:
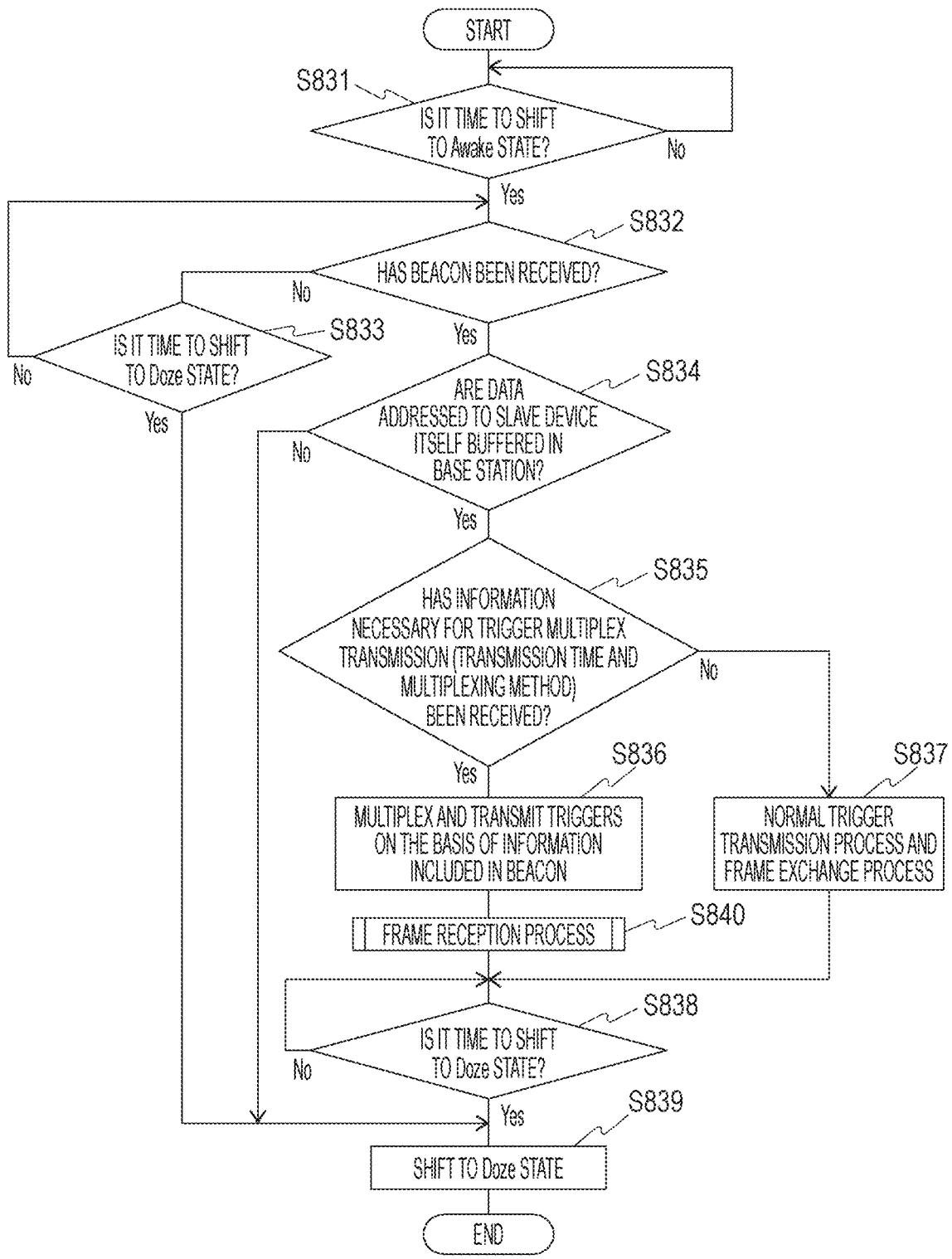
FIG. 22 is a flowchart illustrating an example of a processing procedure for a data reception process by the slave device 201 according to the embodiment of the present technology.

FIG. 22 is a flowchart illustrating an example of a processing procedure for a data reception process by the slave device 201 according to the embodiment of the present technology. FIG. 22 illustrates an example in which the slave device 201 is initially in the doze state.

First, the control unit of the slave device 201 (corresponding to the control unit 160 illustrated in FIG. 2) determines whether it is time to shift to the awake state (step S831). In a case where it is not time to shift to the awake state (step S831), monitoring is continued.

In a case where it is time to shift to the awake state (step S831), the slave device 201 shifts to the awake state, and the control unit of the slave device 201 determines whether a beacon has been received (step S832). In a case where a beacon has not been received (step S832), the control unit of the slave device 201 determines whether it is time to shift to the doze state (step S833).

In a case where it is time to shift to the doze state (step S833), the slave device 201 shifts to the doze state (step S839). In a case where it is not time to shift to the doze state (step S833), the process returns to step S832.

In a case where a beacon has been received (step S832), the control unit of the slave device 201 determines whether data addressed to the slave device 201 itself are buffered in the base station 100 on the basis of information included in the received beacon (for example, PVB illustrated in FIG. 6) (step S834). In a case where data addressed to the slave device 201 itself are not buffered in the base station 100 (step S834), the process proceeds to step S839. Note that in a case where data addressed to the slave device 201 itself are not buffered in the base station 100 (step S834), the process may proceed to step S839 at the timing for shifting to the doze state.

In a case where data addressed to the slave device 201 itself are buffered in the base station 100 (step S834), the control unit of the slave device 201 determines whether information necessary for trigger multiplex transmission is included in the received beacon (Step S835). In a case where information necessary for trigger multiplex transmission is included in the received beacon (step S835), the control unit of the slave device 201 multiplexes triggers on the basis of the information necessary for trigger multiplex transmission, and transmits the multiplexed triggers to the base station 100 (step S836). Note that steps S831 to S836 are an example of a control step of transmitting described in the claims.

Subsequently, a frame reception process is performed (step S840). This frame reception process will be described in detail with reference to FIG. 23.

Subsequently, the control unit of the slave device 201 determines whether it is time to shift to the doze state (step S838). In a case where it is not time to shift to the doze state (step S838), monitoring is continued.

In a case where it is time to shift to the doze state (step S838), the slave device shifts to the doze state (step S839).

Further, in a case where information necessary for trigger multiplex transmission is not included in the received beacon (step S835), the control unit of the slave device 201 performs a normal trigger transmission process and a normal frame exchange process (step S837), and the process proceeds to step S838.

[Example of Frame Reception Process]

Figure 23:
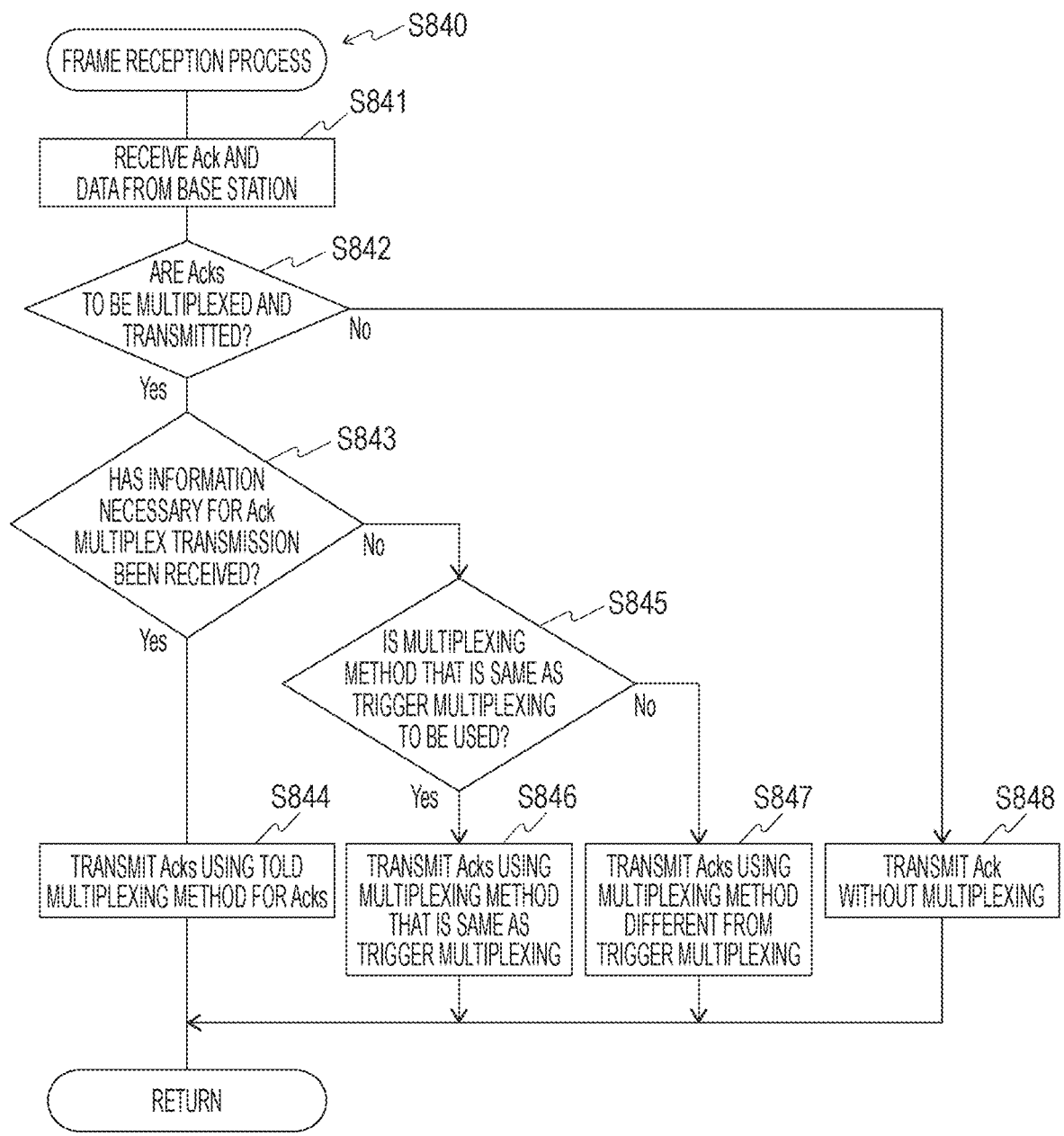
FIG. 23 is a flowchart illustrating an example of a frame reception process of the data reception process by the slave device 201 according to the embodiment of the present technology.

FIG. 23 is a flowchart illustrating an example of a frame reception process (step S840 illustrated in FIG. 22) of the data reception process by the slave device 201 according to the embodiment of the present technology.

First, the control unit of the slave device 201 receives an Ack and data from the base station 100 (step S841).

Subsequently, the control unit of the slave device 201 determines whether the setting specifies that Acks are to be multiplexed and transmitted in response to the received data (step S842). In a case where the setting specifies that Acks are to be multiplexed and transmitted (step S842), the control unit of the slave device 201 determines whether information necessary for Ack multiplex transmission has been received (step S843). For example, the control unit of the slave device 201 determines whether information necessary for Ack multiplex transmission is included in the received beacon (step S843).

In a case where information necessary for Ack multiplex transmission has been received (step S843), the control unit of the slave device 201 multiplexes Acks on the basis of the information necessary for Ack multiplex transmission, and transmits the multiplexed Acks to the base station 100 (step S844).

In a case where information necessary for Ack multiplex transmission has not been received (step S843), the control unit of the slave device 201 determines whether the setting specifies that Acks are to be multiplexed and transmitted using the method that is the same as the multiplexing method for trigger multiplex transmission (step S845). Note that the multiplexing method for trigger multiplex transmission has been told to each slave device as the information necessary for trigger multiplex transmission.

In a case where the setting specifies that Acks are to be multiplexed and transmitted using the method that is the same as the multiplexing method for trigger multiplex transmission (step S845), the control unit of the slave device 201 multiplexes and transmits Acks using the method that is the same as the multiplexing method for trigger multiplex transmission (step S846).

In a case where the setting does not specify that Acks are to be multiplexed and transmitted using the method that is the same as the multiplexing method for trigger multiplex transmission (step S845), the control unit of the slave device 201 multiplexes and transmits Acks using a method different from the multiplexing method for trigger multiplex transmission (step S847).

In a case where the setting does not specify that Acks are to be multiplexed and transmitted (step S842), the control unit of the slave device 201 transmits an Ack without multiplexing (step S848).

Here, in the Ack multiplexing method illustrated in FIG. 23, typically by using the method told in advance or by using the multiplexing method that is the same as the trigger multiplexing, multiplexed communication can be performed without going through a procedure for coordination with the plurality of slave devices again.

As described above, according to the embodiment of the present technology, by multiplexing triggers such as PS-Polls, time loss due to the collision avoidance algorithm and time loss due to communication performed by one slave device and a resulting communication failure in another slave device can be reduced. As a result, it is possible to increase the time during which the slave device is in the functional suspension state including the doze state, and it is possible to reduce power consumption.

Further, for example, multiplexed communication can be effectively performed by using multiplexing immediately after the cancellation of the functional suspension state.

In addition, information necessary for multiplexing triggers such as PS-Polls can be efficiently conveyed.

Further, the base station 100 and the slave devices 201 to 203 according to the embodiment of the present technology can be applied to devices that are used in various fields. For example, they can be applied to wireless devices that are used in cars (for example, car navigation devices and smartphones). Further, for example, they can be applied to learning devices that are used in the education field (for example, tablet terminals). Further, for example, they can be applied to wireless devices that are used in the agricultural field (for example, terminals of a cattle management system). Similarly, for example, they can be applied to various wireless devices that are used in the sports field, medical field, and the like.

2. Application Example

The technology according to the present disclosure can be applied to various products. For example, the base station 100 and the slave devices 201 to 203 may be realized as mobile terminals such as a smartphone, a tablet personal computer (PC), a notebook PC, a portable game terminal, or a digital camera, fixed terminals such as a television receiver, a printer, a digital scanner, or a network storage, or in-vehicle terminals such as a car navigation device. In addition, the base station 100 and the slave devices 201 to 203 may be realized as terminals that perform machine-to-machine (M2M) communication (also referred to as machine type communication (MTC) terminals) such as a smart meter, a vending machine, a remote monitoring device, or a point-of-sale (POS) terminal. Further, the base station 100 and the slave devices 201 to 203 may be a wireless communication module (for example, integrated circuit module including one die) mounted in each of these terminals.

On the other hand, for example, the base station 100 may be realized as a wireless LAN access point (also referred to as a wireless base station) that has or does not have a router function. Further, the base station 100 may be realized as a mobile wireless LAN router. Further, the base station 100 may be a wireless communication module (for example, an integrated circuit module including one die) mounted in each of these devices.

2-1. First Application Example

Figure 24:
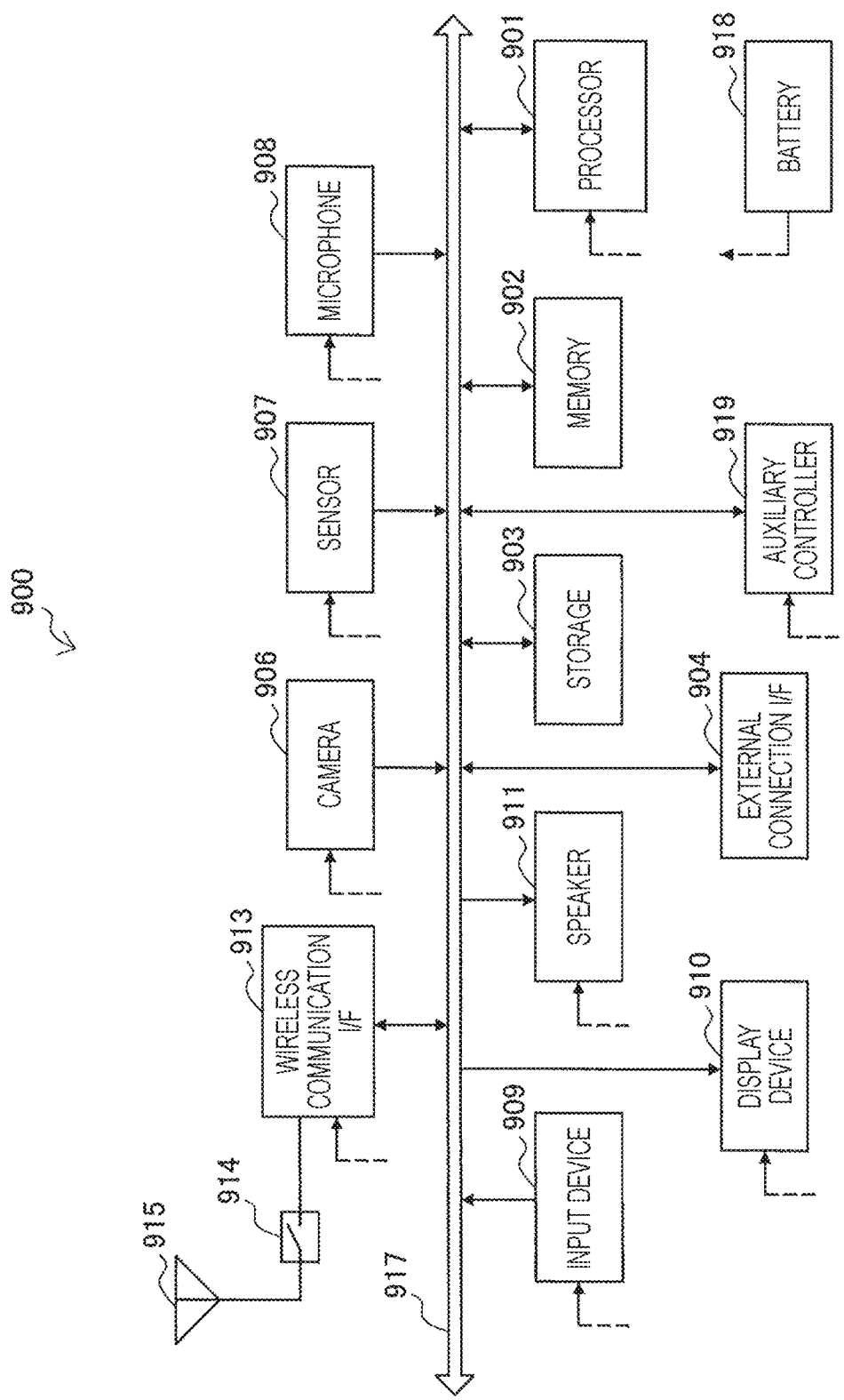
FIG. 24 is a block diagram illustrating an example of a schematic configuration of a smartphone.

FIG. 24 is a block diagram illustrating an example of a schematic configuration of a smartphone 900 to which the technology according to the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls functions of an application layer and other layers of the smartphone 900. The memory 902 includes a random access memory (RAM) and a read only memory (ROM), and stores programs to be executed by the processor 901 and data. The storage 903 can include a storage medium such as a semiconductor memory or a hard disk. The external connection interface 904 is an interface for coupling an external device such as a memory card or a universal serial bus (USB) device to the smartphone 900.

The camera 906 has, for example, an image sensor such as a charge coupled device (CCD) or a complementary metal oxide semiconductor (CMOS), and generates a captured image. The sensor 907 can include, for example, a group of sensors such as a positioning sensor, a gyro sensor, a geomagnetic sensor, and an acceleration sensor. The microphone 908 converts sound input to the smartphone 900 into a sound signal. The input device 909 includes, for example, a touch sensor that detects a touch on a screen of the display device 910, a keypad, a keyboard, a button, a switch, or the like, and accepts operation or information input from a user. The display device 910 has a screen such as a liquid crystal display (LCD) or an organic light emitting diode (OLED) display, and displays an output image of the smartphone 900. The speaker 911 converts a sound signal output from the smartphone 900 into sound.

The wireless communication interface 913 supports one or more of the wireless LAN standards such as IEEE 802.11a, 11b, 11g, 11n, 11ac, and 11ad, and executes wireless communication. The wireless communication interface 913 can communicate with other devices via a wireless LAN access point in an infrastructure mode. In addition, the wireless communication interface 913 can directly communicate with other devices in an ad-hoc mode or a direct communication mode such as Wi-Fi Direct. Note that, in the Wi-Fi Direct, unlike the ad hoc mode, one of the two terminals operates as an access point, but communication is directly performed between these terminals. The wireless communication interface 913 can typically include a baseband processor, a radio frequency (RF) circuit, a power amplifier, and the like. The wireless communication interface 913 may be a one-chip module in which a memory that stores a communication control program, a processor that executes the program, and related circuits are integrated. In addition to the wireless LAN method, the wireless communication interface 913 may support other types of wireless communication methods such as a near field wireless communication method, a proximity wireless communication method, or a cellular communication method. The antenna switch 914 switches the connection destination of the antenna 915 among a plurality of circuits (for example, circuits for different wireless communication methods) included in the wireless communication interface 913. The antenna 915 has one or more antenna elements (for example, a plurality of antenna elements that constitutes a MIMO antenna), and is used for the transmission and reception of wireless signals by the wireless communication interface 913.

Note that the smartphone 900 is not limited to the example of FIG. 24, and may include a plurality of antennas (for example, an antenna for the wireless LAN, an antenna for the proximity wireless communication method, and the like). In this case, the antenna switch 914 may be removed from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919. The battery 918 supplies power to the respective blocks of the smartphone 900 illustrated in FIG. 24 via power supply lines partially indicated by broken lines in the drawing. The auxiliary controller 919 operates a minimum necessary function of the smartphone 900 in a sleep mode, for example.

In the smartphone 900 illustrated in FIG. 24, the control unit 160 described with reference to FIG. 2 may be implemented in the wireless communication interface 913. In addition, at least a part of these functions may be implemented in the processor 901 or the auxiliary controller 919. For example, the power consumption of the battery 918 can be reduced through the execution of trigger multiplex transmission.

Note that the processor 901 may execute an access point function at the application level to cause the smartphone 900 to operate as a wireless access point (software AP). Further, the wireless communication interface 913 may have a wireless access point function.

2-2. Second Application Example

Figure 25:
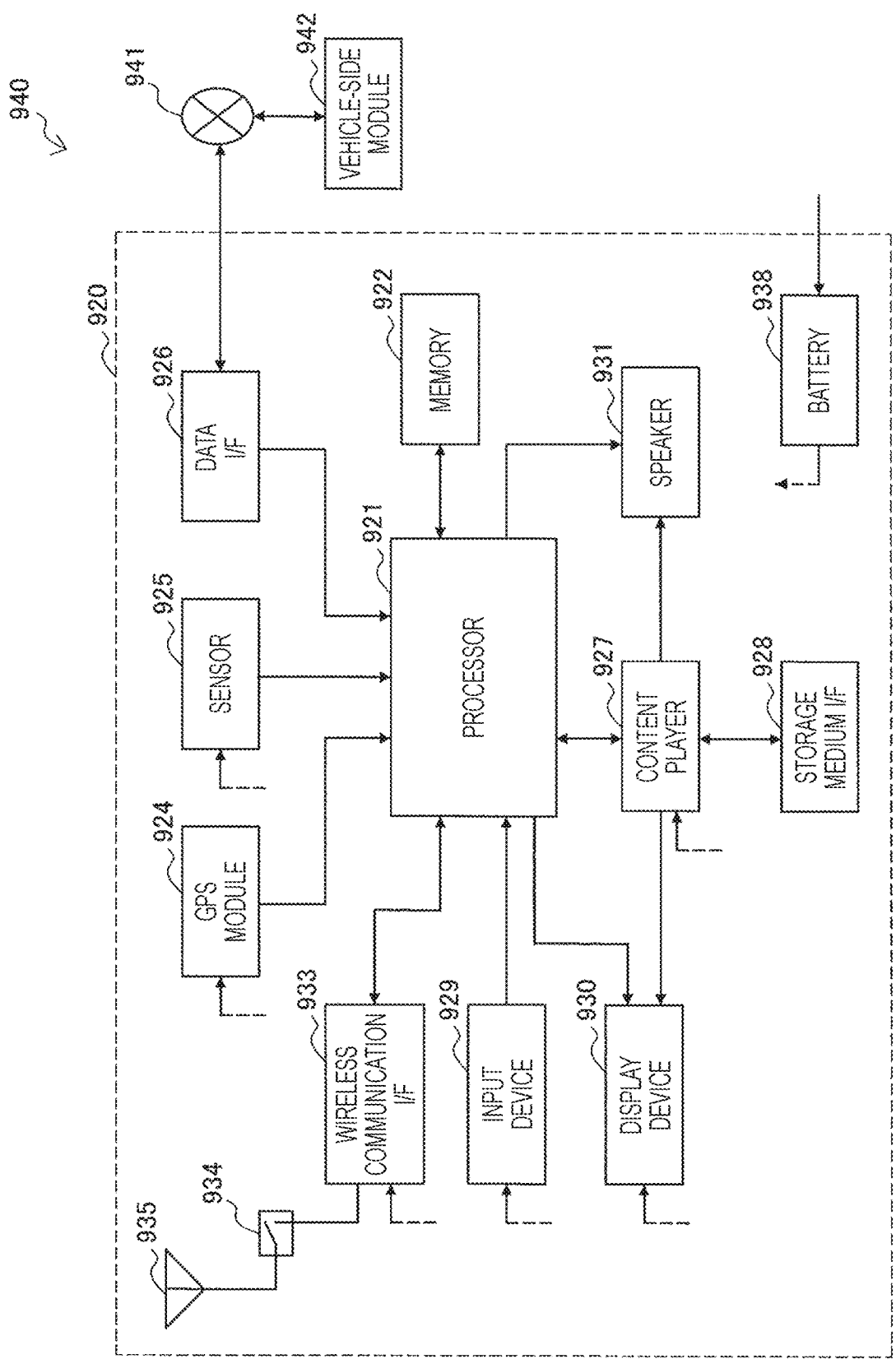
FIG. 25 is a block diagram illustrating an example of a schematic configuration of a car navigation device.

FIG. 25 is a block diagram illustrating an example of a schematic configuration of a car navigation device 920 to which the technology according to the present disclosure can be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC, and controls a navigation function and other functions of the car navigation device 920. The memory 922 includes a RAM and a ROM, and stores programs to be executed by the processor 921 and data.

The GPS module 924 measures the position (e.g., latitude, longitude, and altitude) of the car navigation device 920 using a GPS signal received from a GPS satellite. The sensor 925 can include, for example, a group of sensors such as a gyro sensor, a geomagnetic sensor, and an atmospheric pressure sensor. The data interface 926 is coupled to an in-vehicle network 941 via a terminal (not illustrated), for example, and acquires data generated on the vehicle side such as vehicle speed data.

The content player 927 reproduces the content stored in a storage medium (for example, CD or DVD) inserted in the storage medium interface 928. The input device 929 includes, for example, a touch sensor that detects a touch on a screen of the display device 930, a button, a switch, or the like, and accepts operation or information input from a user. The display device 930 has a screen such as an LCD or an OLED display, and displays an image of the navigation function or reproduced content. The speaker 931 outputs the sound of the navigation function or reproduced content.

The wireless communication interface 933 supports one or more of the wireless LAN standards such as IEEE 802.11a, 11b, 11g, 11n, 11ac, and 11ad, and executes wireless communication. The wireless communication interface 933 can communicate with other devices via a wireless LAN access point in an infrastructure mode. In addition, the wireless communication interface 933 can directly communicate with other devices in an ad-hoc mode or a direct communication mode such as Wi-Fi Direct. The wireless communication interface 933 can typically include a baseband processor, an RF circuit, a power amplifier, and the like. The wireless communication interface 933 may be a one-chip module in which a memory that stores a communication control program, a processor that executes the program, and related circuits are integrated. In addition to the wireless LAN method, the wireless communication interface 933 may support other types of wireless communication methods such as a near field wireless communication method, a proximity wireless communication method, or a cellular communication method. The antenna switch 934 switches the connection destination of the antenna 935 among a plurality of circuits included in the wireless communication interface 933. The antenna 935 has one or more antenna elements, and is used for the transmission and reception of wireless signals by the wireless communication interface 933.

Note that the car navigation device 920 is not limited to the example of FIG. 25, and may include a plurality of antennas. In this case, the antenna switch 934 may be removed from the configuration of the car navigation device 920.

The battery 938 supplies power to the respective blocks of the car navigation device 920 illustrated in FIG. 25 via power supply lines partially indicated by broken lines in the drawing. Further, the battery 938 accumulates power supplied from the vehicle side.

In the car navigation device 920 illustrated in FIG. 25, the control unit 160 described with reference to FIG. 2 may be implemented in the wireless communication interface 933. In addition, at least a part of these functions may be implemented in the processor 921.

Further, the wireless communication interface 933 may operate as the above-described base station 100 to provide a wireless connection to a terminal carried by a user seated in the vehicle.

In addition, the technology according to the present disclosure may be realized as an in-vehicle system (or vehicle) 940 including one or more of the blocks of the above car navigation device 920, the in-vehicle network 941, and a vehicle-side module 942. The vehicle-side module 942 generates vehicle-side data such as vehicle speed, engine speed, or failure information, and outputs the generated data to the in-vehicle network 941.

2-3. Third Application Example

Figure 26:
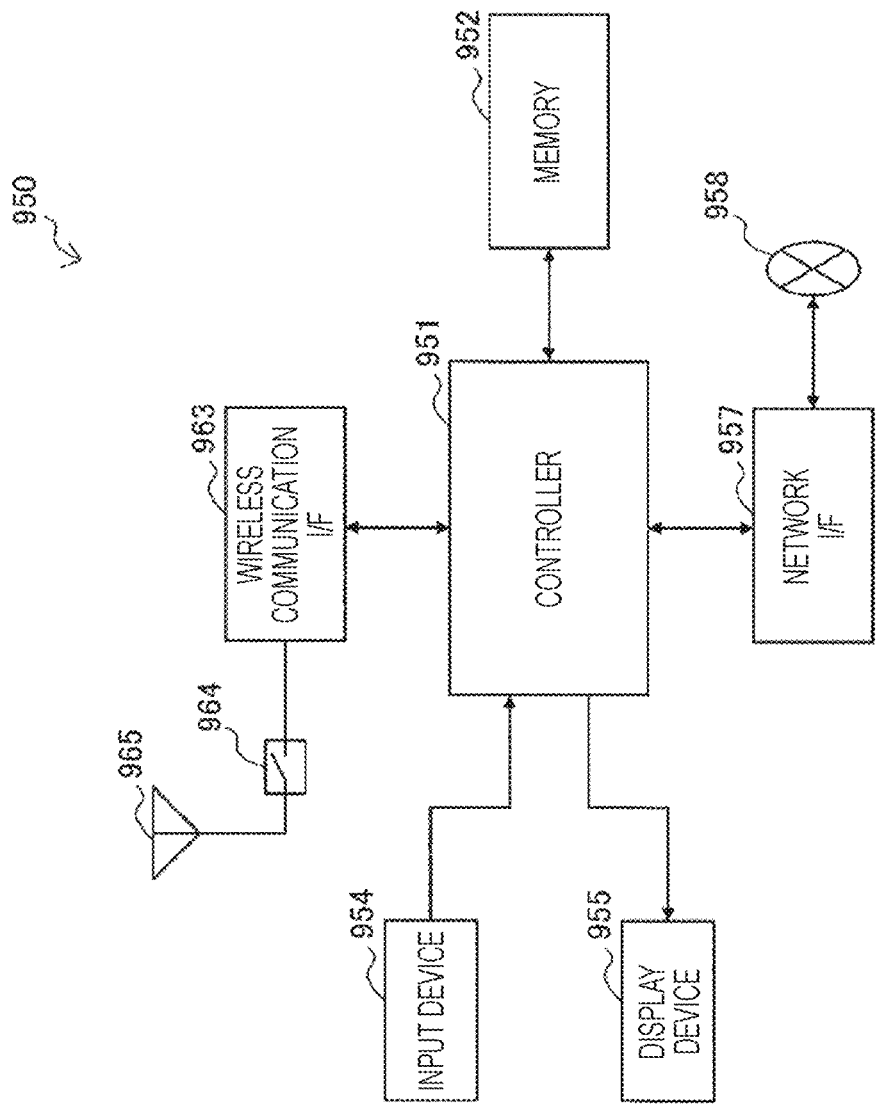
FIG. 26 is a block diagram illustrating an example of a schematic configuration of a wireless access point.

FIG. 26 is a block diagram illustrating an example of a schematic configuration of a wireless access point 950 to which the technology according to the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP), and operates various functions of an internet protocol (IP) layer and upper layers of the wireless access point 950 (for example, access restriction, routing, encryption, firewall, log management, and the like). The memory 952 includes a RAM and a ROM, and stores programs to be executed by the controller 951 and various control data (for example, terminal list, routing table, encryption key, security setting, log, and the like).

The input device 954 includes, for example, a button, a switch, or the like, and accepts operation from a user. The display device 955 includes an LED lamp or the like, and displays the operation status of the wireless access point 950.

The network interface 957 is a wired communication interface that allows the wireless access point 950 to connect to a wired communication network 958. The network interface 957 may have a plurality of connection terminals. The wired communication network 958 may be a LAN such as Ethernet (registered trademark) or a wide area network (WAN).

The wireless communication interface 963 supports one or more of the wireless LAN standards such as IEEE 802.11a, 11b, 11g, 11n, 11ac, and 11ad, and provides a wireless connection as an access point to a neighboring terminal. The wireless communication interface 963 can typically include a baseband processor, an RF circuit, a power amplifier, and the like. The wireless communication interface 963 may be a one-chip module in which a memory that stores a communication control program, a processor that executes the program, and related circuits are integrated. The antenna switch 964 switches the connection destination of the antenna 965 among a plurality of circuits included in the wireless communication interface 963. The antenna 965 has one or more antenna elements, and is used for the transmission and reception of wireless signals by the wireless communication interface 963.

In the wireless access point 950 illustrated in FIG. 26, the control unit 160 described with reference to FIG. 2 may be implemented in the wireless communication interface 963. In addition, at least a part of these functions may be implemented in the controller 951.

Note that the above-mentioned embodiment indicates an example for embodying the present technology, and matters in the embodiment and matters specifying the invention in the claims correlate to each other. Similarly, the matters specifying the invention in the claims and matters denoted by the same names in the embodiment of the present technology correlate to each other. However, the present technology is not limited to the embodiment, and can be embodied by performing various types of modifications on the embodiment within a range not departing from the gist of the technology.

In addition, the processing procedures explained in the above-mentioned embodiment may be regarded as a method having a series of these procedures, or may be regarded as a program for causing a computer to execute the series of these procedures, or as a recording medium that stores the program. As the recording medium, for example, a compact disc (CD), a MiniDisc (MD), a digital versatile disc (DVD), a memory card, a Blu-ray (registered trademark) disc, or the like can be used.

Note that the effects described in the present description are only examples, and the effects of the present technology are not limited to these effects. Additional effects may also be obtained.

Note that the present technology can also be configured as follows.

(1)

An information processing device including:

a control unit that performs control to tell a first device a multiplexing method for notification information and presence of data addressed to the first device, the first device having a multiplexing function for multiplexing and transmitting data from a plurality of devices including the first device to the information processing device, the notification information indicating that the first device has shifted from a functional suspension state to a data receivable state.

(2)

The information processing device according to (1), in which the control unit performs control to receive the notification information multiplexed and transmitted by the first device according to the multiplexing method told.

(3)

The information processing device according to (2), in which after receiving the notification information, the control unit performs control to multiplex data to be transmitted to the first device and transmit the data to the first device.

(4)

The information processing device according to (3), in which the control unit performs control to multiplex the data using a multiplexing method that is the same as or different from the multiplexing method told, and transmit the data to the first device.

(5)

The information processing device according to (4), in which the control unit performs control to tell a frequency multiplexing method or a spatial multiplexing method as the multiplexing method, multiplex the data using a multiplexing method that is the same as the frequency multiplexing method or spatial multiplexing method told, and transmit the data to the first device.

(6)

The information processing device according to any of (3) to (5), in which the control unit performs control to tell the first device a multiplexing method for the data together with the multiplexing method for the notification information.

(7)

The information processing device according to any of (1) to (6), in which the control unit performs control to tell the first device information to be used for multiplexing transmission of the notification information together with the multiplexing method for the notification information.

(8)

The information processing device according to (7), in which the control unit tells the first device, as the information to be used for the multiplexing transmission of the notification information, either frequency assignment for frequency multiplexing of the notification information or matrix index assignment for spatial multiplexing of the notification information, information about transmission time for the notification information, and information about transmission power for the notification information.

(9)

The information processing device according to any of (1) to (7), in which the control unit tells the first device using a bitmap generated on the basis of a partial virtual bitmap (PVB).

(10)

The information processing device according to any of (1) to (9), in which the control unit confirms in advance that the first device has the multiplexing function for the notification information.

(11)

The information processing device according to any of (1) to (10), in which the control unit tells the first device at a timing when the first device is estimated to have shifted from the functional suspension state to the data receivable state.

(12)

The information processing device according to any of (1) to (11), in which the control unit tells the first device using a beacon or another frame transmitted after the beacon.

(13)

An information processing device including:

a control unit that performs control to, in response to a multiplexing method for notification information indicating a shift from a functional suspension state to a data receivable state being told by another device, multiplex the notification information according to the multiplexing method and transmit the notification information to the other device.

(14)

The information processing device according to (13), in which the control unit performs control to receive multiplexed data transmitted from the other device after transmitting the notification information, and multiplex and transmit data to be transmitted to the other device after transmitting the notification information.

(15)

The information processing device according to (14), in which the control unit performs control to multiplex the data using a multiplexing method that is the same as or different from the multiplexing method told, and transmit the data to the other device.

(16)

The information processing device according to (15), in which the control unit multiplexes the data using a multiplexing method for the data told together with the multiplexing method for the notification information, and transmits the data to the other device.

(17)

An information processing method including:

a control step of telling a first device a multiplexing method for notification information and presence of data addressed to the first device, the first device having a multiplexing function for multiplexing and transmitting data from a plurality of devices including the first device to an information processing device, the notification information indicating that the first device has shifted from a functional suspension state to a data receivable state.

(18)

An information processing method including:

a control step of, in response to a multiplexing method for notification information indicating a shift from a functional suspension state to a data receivable state being told by another device, multiplexing the notification information according to the multiplexing method and transmitting the notification information to the other device.

(19)

A program that causes a computer to execute:

a control step of telling a first device a multiplexing method for notification information and presence of data addressed to the first device, the first device having a multiplexing function for multiplexing and transmitting data from a plurality of devices including the first device to an information processing device, the notification information indicating that the first device has shifted from a functional suspension state to a data receivable state.

(20)

A program that causes a computer to execute:

a control step of, in response to a multiplexing method for notification information indicating a shift from a functional suspension state to a data receivable state being told by another device, multiplexing the notification information according to the multiplexing method and transmitting the notification information to the other device.

(21)

A communication system including:

a slave device having a multiplexing function for multiplexing and transmitting data from a plurality of slave devices to a base station, the slave device being configured to, in response to a multiplexing method for notification information indicating a shift from a functional suspension state to a data receivable state being told by the base station, multiplex the notification information according to the multiplexing method and transmit the notification information to the base station; and the base station that tells the slave device the multiplexing method for the notification information and presence of data addressed to the slave device, the notification information indicating that the slave device has shifted from the functional suspension state to the data receivable state.

REFERENCE SIGNS LIST

10 Communication system
100 Base station (information processing device)
110 Data processing unit
120 Signal processing unit
130 Interface unit
140 Antenna
150 Storage unit
160 Control unit
201 to 203 Slave device (information processing device)
900 Smartphone
901 Processor
902 Memory
903 Storage
904 External connection interface
906 Camera
907 Sensor
908 Microphone
909 Input device
910 Display device
911 Speaker
913 Wireless communication interface
914 Antenna switch
915 Antenna
917 Bus
918 Battery
919 Auxiliary controller
920 Car navigation device
921 Processor
922 Memory
924 GPS module
925 Sensor
926 Data interface
927 Content player
928 Storage medium interface
929 Input device
930 Display device
931 Speaker
933 Wireless communication interface
934 Antenna switch
935 Antenna
938 Battery
941 In-vehicle network
942 Vehicle-side module
950 Wireless access point
951 Controller
952 Memory
954 Input device
955 Display device
957 Network interface
958 Wired communication network
963 Wireless communication interface
964 Antenna switch
965 Antenna

The invention claimed is:

1. An information processing device configured to operate as a base station in a wireless communication network and comprising:

a transceiver; and control circuitry configured to:

transmit a notification to a first device via a frame different from a beacon, wherein the notification comprises:

a downlink multiplexing method and an uplink multiplexing method, and a presence of data addressed to the first device, the first device having a multiplexing function for multiplexing and transmitting data from a plurality of devices, including the first device, to the information processing device, in reply to the notification, receive the notification response information from the first device, wherein the notification response information is multiplexed in accordance with the uplink multiplexing method and indicates that the first device has shifted from a functional suspension state to a data receivable state, wherein the notification response information in embedded in a message that includes M long training fields which are encoded such that a row of an encoding matrix including M rows and M columns is assigned and each column of the row is multiplied by each of the M long training fields, and a cross-correlation between any two rows of the encoding matrix is zero, M being an integer larger than or equal to 2, transmit an acknowledgement to the notification response information to the first device, wherein the acknowledgement is included in an acknowledgement frame that also contains an identifier of at least one the plurality of devices that includes the first device, and after transmitting the acknowledgement, transmit the data to the first device, the data multiplexed in accordance with the downlink multiplexing method.

2. The information processing device of claim 1, wherein each of the uplink multiplexing method and the downlink multiplexing method comprises one of a frequency multiplexing method or a spatial multiplexing method.

3. The information processing device of claim 2, wherein the notification further comprises a frequency assignment for the frequency multiplexing method or a matrix index assignment for spatial multiplexing method.

4. The information processing device of claim 1, wherein the notification is indicated via a bitmap generated based on a partial virtual bitmap (PVB).

5. The information processing device of claim 1, wherein the notification further comprises a time for when the first device is to shift from the functional suspension state to the data receivable state.

6. An information processing device configured to communicate with a base station in a wireless communication network and comprising:
a transceiver; and
control circuitry configured to:
receive a notification from the base station via a frame different from a beacon, wherein the notification comprises:
a downlink multiplexing method and an uplink multiplexing method, and
a presence of data addressed to the information processing device, the information processing device having a multiplexing function for multiplexing and transmitting data from a plurality of devices, including the information processing device, to the base station,
in reply to the notification, transmit the notification response information to the base station,
wherein the notification response information is multiplexed in accordance with the uplink multiplexing method and indicates that the information processing device has shifted from a functional suspension state to a data receivable state,
wherein the notification response information in embedded in a message that includes M long training fields which are encoded such that a row of an encoding matrix including M rows and M columns is assigned and each column of the row is multiplied by each of the M long training fields, and a cross-correlation between any two rows of the encoding matrix is zero, M being an integer larger than or equal to 2,
receive an acknowledgement to the notification response information from the base station,
wherein the acknowledgement is included in an acknowledgement frame that also contains an identifier of at least one the plurality of devices that includes the information processing device,
after receiving the acknowledgement, receive the data from the base station, the data multiplexed in accordance with the downlink multiplexing method.

7. The information processing device of claim 6, wherein each of the uplink multiplexing method and the downlink multiplexing method comprises one of a frequency multiplexing method or a spatial multiplexing method.

8. The information processing device of claim 7, wherein the notification further comprises a frequency assignment for the frequency multiplexing method or a matrix index assignment for spatial multiplexing method.

9. The information processing device of claim 6, wherein the notification is indicated via a bitmap generated based on a partial virtual bitmap (PVB).

10. The information processing device of claim 6, wherein the notification further comprises a time for when the information processing device is to shift from the functional suspension state to the data receivable state.

11. A method performed by an information processing device configured to operate as a base station in a wireless communication network, the method comprising:
transmitting a notification to a first device via a frame different from a beacon, wherein the notification comprises:
a downlink multiplexing method and an uplink multiplexing method, and
a presence of data addressed to the first device, the first device having a multiplexing function for multiplexing and transmitting data from a plurality of devices, including the first device, to the information processing device,
in reply to the notification, receiving the notification response information from the first device,
wherein the notification response information is multiplexed in accordance with the uplink multiplexing method and indicates that the first device has shifted from a functional suspension state to a data receivable state,
wherein the notification response information in embedded in a message that includes M long training fields which are encoded such that a row of an encoding matrix including M rows and M columns is assigned and each column of the row is multiplied by each of the M long training fields, and a cross-correlation between any two rows of the encoding matrix is zero, M being an integer larger than or equal to 2,
transmitting an acknowledgement to the notification response information to the first device,
wherein the acknowledgement is included in an acknowledgement frame that also contains an identifier of at least one the plurality of devices that includes the first device, and
after transmitting the acknowledgement, transmitting the data to the first device, the data multiplexed in accordance with the downlink multiplexing method.

12. A method performed by an information processing device configured to communicate with a base station in a wireless communication network, the method comprising:
receiving a notification from the base station via a frame different from a beacon, wherein the notification comprises:
a downlink multiplexing method and an uplink multiplexing method, and
a presence of data addressed to the information processing device, the information processing device having a multiplexing function for multiplexing and transmitting data from a plurality of devices, including the information processing device, to the base station,
in reply to the notification, transmitting the notification response information to the base station,
wherein the notification response information is multiplexed in accordance with the uplink multiplexing method and indicates that the information processing device has shifted from a functional suspension state to a data receivable state,
wherein the notification response information in embedded in a message that includes M long training fields which are encoded such that a row of an encoding matrix including M rows and M columns is assigned and each column of the row is multiplied by each of the M long training fields, and a cross-correlation between any two rows of the encoding matrix is zero, M being an integer larger than or equal to 2,
receiving an acknowledgement to the notification response information from the base station,
wherein the acknowledgement is included in an acknowledgement frame that also contains an identifier of at least one the plurality of devices that includes the information processing device, after receiving the acknowledgement, receiving the data from the base station, the data multiplexed in accordance with the downlink multiplexing method.

* * * * *